(12) United States Patent
Malayath

(10) Patent No.: US 12,165,416 B2
(45) Date of Patent: Dec. 10, 2024

(54) DETERMINING COMMON OPERATIONS FOR IMAGE PROCESSING COMPUTING COMPONENTS

(71) Applicant: QUALCOMM Incorporated, San Diego, CA (US)

(72) Inventor: Narendranath Malayath, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 777 days.

(21) Appl. No.: 17/187,202

(22) Filed: Feb. 26, 2021

(65) Prior Publication Data

US 2022/0277164 A1    Sep. 1, 2022

(51) Int. Cl.
| | | |
|---|---|---|
| *G06V 20/58* | (2022.01) | |
| *B60W 30/09* | (2012.01) | |
| *G05D 1/00* | (2006.01) | |
| *H04N 19/117* | (2014.01) | |
| *H04N 19/146* | (2014.01) | |

(52) U.S. Cl.
CPC ............ *G06V 20/58* (2022.01); *B60W 30/09* (2013.01); *G05D 1/0088* (2013.01); *G05D 1/0221* (2013.01); *H04N 19/117* (2014.11); *H04N 19/146* (2014.11); *B60W 2420/403* (2013.01); *B60W 2554/4029* (2020.02)

(58) Field of Classification Search
None
See application file for complete search history.

(56) References Cited

U.S. PATENT DOCUMENTS

| 8,358,686 B2* | 1/2013 | Stephan | H04N 19/61 |
| | | | 375/240.16 |
| 10,466,697 B2* | 11/2019 | Yunoki | G05D 1/0231 |
| 2018/0364705 A1* | 12/2018 | Yunoki | H04N 7/183 |
| 2019/0306521 A1* | 10/2019 | Zhao | H04N 19/60 |

(Continued)

FOREIGN PATENT DOCUMENTS

WO    2012020092 A1    2/2012

OTHER PUBLICATIONS

International Search Report and Written Opinion—PCT/US2022/015700—ISA/EPO—May 31, 2022.

(Continued)

*Primary Examiner* — Tahmina N Ansari
(74) *Attorney, Agent, or Firm* — Polsinelli LLP

(57) ABSTRACT

Systems, methods, and computer-readable media are provided for efficient control and data utilization between processing components of a system. An method can include obtaining image data captured by an image sensor; prior to a first computing component performing a first set of operations on the image data and a second computing component performing a second set of operations on the image data, determining one or more common operations included in the first set of operations and the second set of operations, wherein the first set of operations is different than the second set of operations; performing the one or more common operations on the image data; and generating an output of the one or more operations for use by the first computing component to perform the first set of operations and the second computing component to perform the second set of operations.

35 Claims, 10 Drawing Sheets

(56) References Cited

U.S. PATENT DOCUMENTS

2020/0043199 A1* 2/2020 Chang ................... G06T 9/001
2022/0303519 A1* 9/2022 Wiegand .............. H04N 13/161

OTHER PUBLICATIONS

Nasser, K., et al., "Real-Time Image and Video Processing: From Research to Reality", Aug. 1, 2006 (Aug. 1, 2006), XP055923234, pp. 1-108, ISBN: 978-1-59829-053-0 Retrieved from the Internet: URL: https://ebookeentral.proquest.com/lib/epo-ebooks/detail.action?dociD=258176 [retrieved on May 19, 2022] the whole document.

* cited by examiner

DETERMINING COMMON OPERATIONS FOR IMAGE PROCESSING COMPUTING COMPONENTS

TECHNICAL FIELD

The present disclosure is generally related to image signal processing and video coding and, more specifically, to data and flow control between image signal processing and video coding components.

BACKGROUND

Many devices and systems allow image and video data to be processed and output for consumption. For example, a camera or a computing device including a camera (e.g., a mobile device such as a mobile telephone or smartphone including one or more cameras) can capture a video or image of a scene, a person, an object, etc. The image or video can be captured and processed by such devices and systems (e.g., mobile devices, IP cameras, etc.) and stored or output for consumption (e.g., displayed on the device and/or other device). In some cases, the image or video can be captured and further processed for effects, such as compression or frame rate up-conversion, and/or certain applications such as computer vision, extended reality (e.g., augmented reality, virtual reality, and the like), image recognition (e.g., face recognition, object recognition, scene recognition, etc.), and autonomous driving, among others. The operations implemented to process image and video data can be computationally intensive. In many cases, the processing of image and/or video data can involve redundant and/or repetitive operations and outputs, and can place a significant burden on the hardware resources of a device.

BRIEF SUMMARY

Disclosed are systems, methods, and computer-readable media for efficient and effective control and data utilization between hardware components. According to at least one example, a method is provided for efficient and effective control and data utilization between image signal processors and video coders. The method can include obtaining image data captured by an image sensor; prior to a first computing component performing a first set of operations on the image data and a second computing component performing a second set of operations on the image data, determining one or more common operations included in the first set of operations and the second set of operations, wherein the first set of operations is different than the second set of operations; performing the one or more common operations on the image data; and generating an output of the one or more operations for use by the first computing component to perform the first set of operations and the second computing component to perform the second set of operations.

According to at least one example, an apparatus is provided for efficient and effective control and data utilization between image signal processors and video coders. In some examples, the apparatus can include memory and one or more processors coupled to the memory, the one or more processors being configured to obtain image data captured by an image sensor; prior to a first computing component performing a first set of operations on the image data and a second computing component performing a second set of operations on the image data, determine one or more common operations included in the first set of operations and the second set of operations, wherein the first set of operations is different than the second set of operations; perform the one or more common operations on the image data; and generate an output of the one or more operations for use by the first computing component to perform the first set of operations and the second computing component to perform the second set of operations.

According to at least one example, a non-transitory computer-readable medium is provided for efficient and effective control and data utilization between image signal processors and video coders. The non-transitory computer-readable medium can include instructions stored thereon which, when executed by one or more processors, cause the one or more processors to obtain image data captured by an image sensor; prior to a first computing component performing a first set of operations on the image data and a second computing component performing a second set of operations on the image data, determine one or more common operations included in the first set of operations and the second set of operations, wherein the first set of operations is different than the second set of operations; perform the one or more common operations on the image data; and generate an output of the one or more operations for use by the first computing component to perform the first set of operations and the second computing component to perform the second set of operations.

According to at least one example, another apparatus is provided for efficient and effective control and data utilization between image signal processors and video coders. The apparatus can include means for obtaining image data captured by an image sensor; prior to a first computing component performing a first set of operations on the image data and a second computing component performing a second set of operations on the image data, determining one or more common operations included in the first set of operations and the second set of operations, wherein the first set of operations is different than the second set of operations; performing the one or more common operations on the image data; and generating an output of the one or more operations for use by the first computing component to perform the first set of operations and the second computing component to perform the second set of operations.

In some aspects, the method, non-transitory computer-readable medium, and apparatuses described above can include providing the output to at least one of the first computing component, the second computing component, and a storage accessible by the first computing component and the second computing component.

In some aspects, the method, non-transitory computer-readable medium, and apparatuses described above can include providing, by an image processor, additional image data to the first computing component and/or the second computing component; and receiving, from the second computing component, control data indicating one or more adjusted parameters for processing the additional image data prior to providing the additional image data to the second computing component, the one or more adjusted parameters being received by at least one of the image processor and the first computing component.

In some examples, the one or more adjusted parameters are based on resource capabilities associated with the second computing component, one or more settings at the second computing component, one or more errors at the second computing component, and/or one or more characteristics of a different output generated by the second computing component based on the second set of operations, the image data, and the output of the one or more operations. In some cases, the one or more adjusted parameters are based on a bitrate associated with the second computing component. In some examples, the one or more adjusted parameters indicate a filtering level for filtering the additional image data. In some examples, the one or more adjusted parameters are based on one or more distortions in a different output generated by the second computing component based on the second set of operations, the image data, and the output of the one or more operations. In some cases, the one or more adjusted parameters indicate one or more image sharpening parameters for sharpening the additional image data.

In some examples, the first computing component can include an image processor and the second computing component can include a video encoder, an extended reality component, a frame rate up-converter, and/or one or more components of an advanced driver-assistance system.

In some aspects, the method, non-transitory computer-readable medium, and apparatuses described above can include determining one or more types of results from the one or more common operations that the first computing component can use for the first set of operations and the second component can use for the second set of operations; and generating the output based on the one or more types of results.

In some examples, the first set of operations can include digital image processing operations, and the second set of operations can include video encoding operations and/or extended reality operations. In some examples, the extended reality operations can include object detection operations, visual inertial odometry operations, obstacle avoidance operations, and/or face detection operations.

In some examples, the first set of operations can include digital image processing operations, and the second set of operations can include advanced driver-assistance system operations. In some cases, the advanced driver-assistance system operations can include speed estimation operations, distance estimation operations, collision avoidance operations, and/or collision detection operations.

In some examples, the one or more common operations can include motion estimation, image segmentation, and/or object detection. In some cases, the output can include an object map, texture information, and/or one or more motion vectors.

In some aspects, the method, non-transitory computer-readable medium, and apparatuses described above can include obtaining, via the second computing component, the output of the one or more common operations; and performing, via the second computing component, the second set of operations using the image data and the output of the one or more common operations. In some aspects, the method, non-transitory computer-readable medium, and apparatuses described above can include prior to performing the second set of operations, refining, via the second computing component, the output for use in the second set of operations.

In some examples, the second set of operations can include encoding the image data. In some aspects, the method, non-transitory computer-readable medium, and apparatuses described above can include generating, via the second computing component, an encoded video bitstream based on the image data, the output of the one or more common operations, and the second set of operations; and transmitting, via the second computing component, the encoded video bitstream.

In some aspects, the method, non-transitory computer-readable medium, and apparatuses described above can include providing the output of the one or more operations to the first computing component, the second computing component, and one or more additional computing components.

In some aspects, each apparatus described above is or includes a camera, a mobile device (e.g., a mobile telephone or so-called "smart phone" or other mobile device), a smart wearable device, an extended reality device (e.g., a virtual reality (VR) device, an augmented reality (AR) device, or a mixed reality (MR) device), a personal computer, a laptop computer, a server computer, an autonomous vehicle, an encoder, a decoder, or other device. In some aspects, the apparatus includes a camera or multiple cameras for capturing one or more videos and/or images. In some aspects, the apparatus further includes a display for displaying one or more videos and/or images. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which.

DETAILED DESCRIPTION

Figure 1:
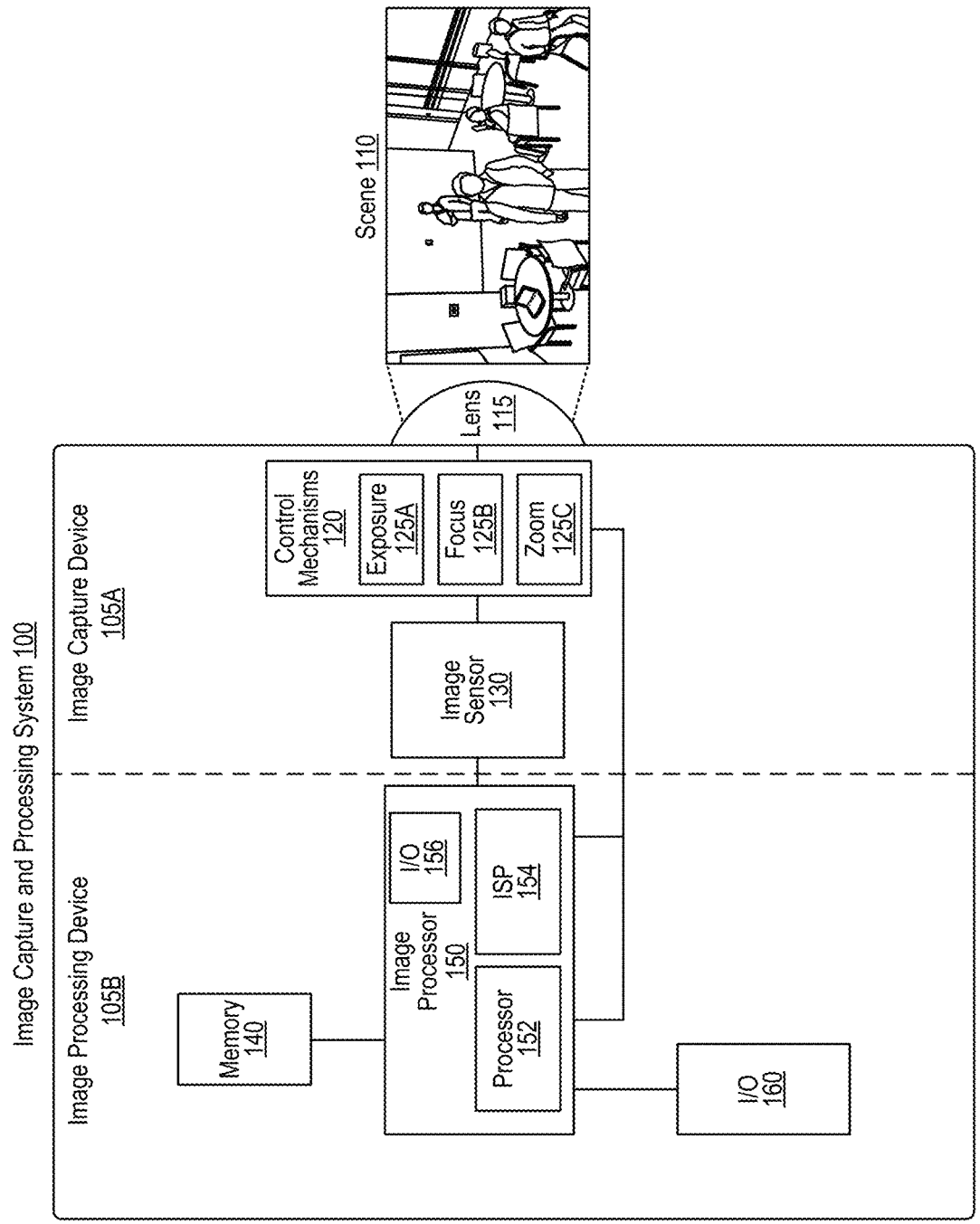
FIG. 1 is a block diagram illustrating an example image capture and processing system, in accordance with some examples of the disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

The demand and consumption of image and video data has significantly increased in consumer and professional settings. As previously noted, devices and systems are commonly equipped with capabilities for capturing and processing image and video data. For example, a camera or a computing device including a camera (e.g., a mobile telephone or smartphone including one or more cameras) can capture a video and/or image of a scene, a person, an object, etc. The image and/or video can be captured and processed and output (and/or stored) for consumption. The image and/or video can be further processed for certain effects, such as compression, frame rate up-conversion, sharpening, colorspace conversion, image enhancement, among others. The image and/or video can also be further processed for certain applications such as computer vision, extended reality (e.g., augmented reality, virtual reality, and the like), image recognition (e.g., face recognition, object recognition, scene recognition, etc.), and autonomous driving, among others. Image and video processing operations can be very computationally intensive.

Often, the image and/or video processing operations can include a number of redundant and/or repetitive operations and outputs, and can place a significant burden on the hardware resources of a device. In many cases, different hardware components of a device may perform redundant and/or similar operations to generate the same or similar data for use by the different hardware components. Such redundancy in operations and/or data is inefficient and can increase the computational burden on the device, which may already be burdened by a number of computationally intensive image and/or video processing operations. For example, in some cases, an image signal processor (ISP) and a video encoder on a device may separately perform the same or similar computations for use in their respective tasks. As another example, an ISP and a computer vision or XR engine may separately perform the same or similar computations for their respective applications. Such redundant computations can place a significant and often unnecessary burden on the device. In many cases, the increased demand on computing resources can negatively impact the performance of the device and the applications implemented by the device.

Systems, apparatuses, methods (also referred to as processes), and computer-readable media are described herein for efficient and effective control and data utilization between hardware components and/or, such as ISPs, video coders, hardware processing engines, etc. The technologies described herein can be used to eliminate and/or reduce redundant computations across different image and/or video hardware pipelines. The elimination and/or reduction of redundant computations can, among other things, reduce hardware and computing costs, increase video and/or image processing performance, and enable new and/or additional features that enhance the quality of processed video and/or image data. In some examples, the technologies described herein can manage and/or coordinate data and computations used by multiple components on a device, to allow re-use of the data and computations and eliminate or reduce redundancy. In some cases, the technologies described herein can control specific parameters used for the data and computations, and can adjust the parameters according to the needs and/or preferences of the components using the computed data.

The techniques described herein can be applied to any computing technologies and applications, such as image processing, computer vision, and video coding, among others. Moreover, video coding technologies described herein can be applied to any video coding techniques. For example, the technologies described herein can be applied to one or more of a variety of block-based video coding techniques in which video is reconstructed on a block-by-block basis. The technologies described herein can be used with any existing video codecs (e.g., High Efficiency Video Coding (HEVC), Advanced Video Coding (AVC), or other suitable existing video codec), and/or any video coding standards being developed and/or future video coding standards, such as, for example, Essential Video Coding (EVC), Versatile Video Coding (VVC), the joint exploration model (JEM), VP9, AV1, and/or other video coding standard in development or to be developed.

Figure 7:
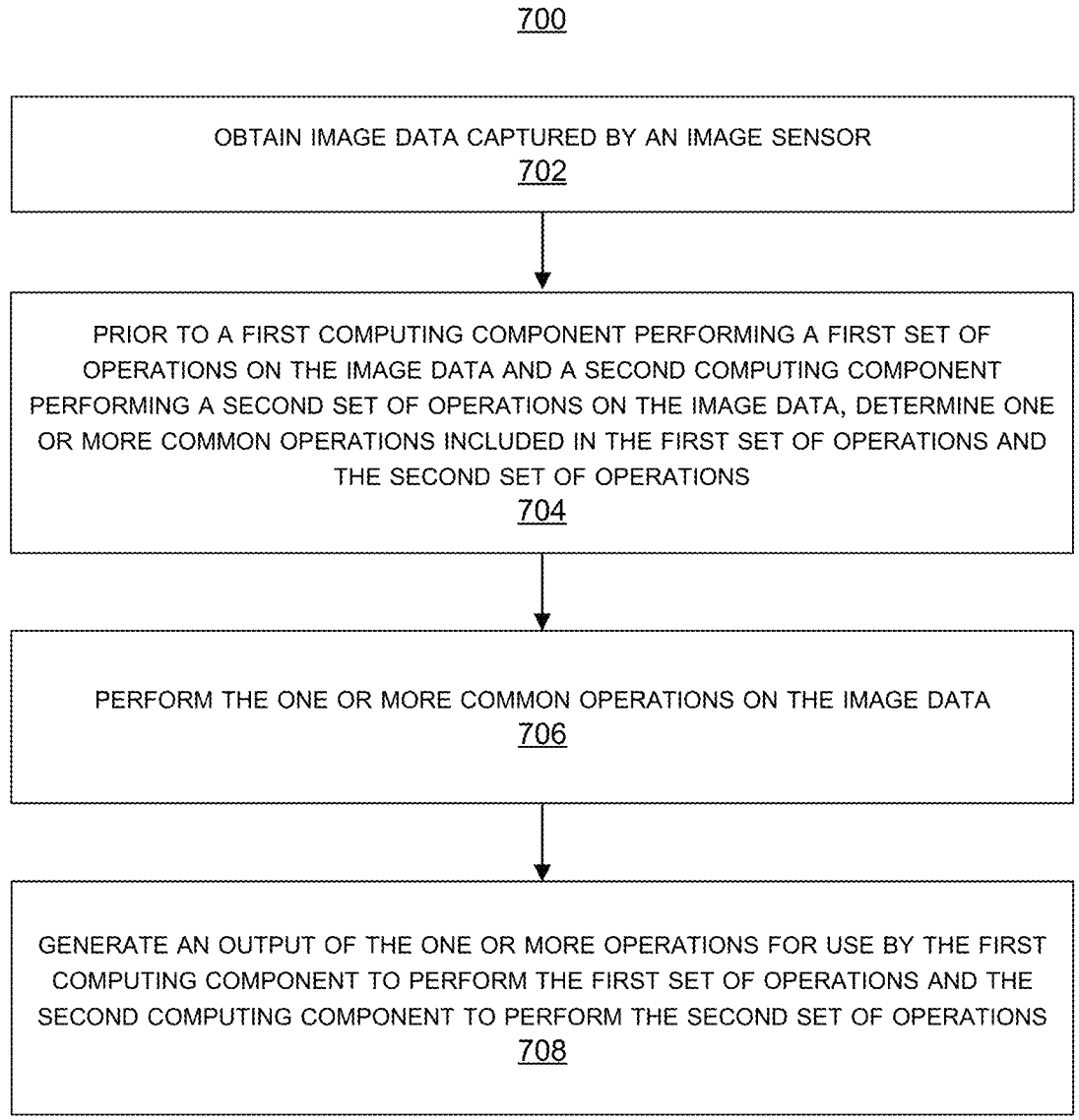
FIG. 7 is a flowchart illustrating an example process for efficient control and data utilization between processing components of a system, in accordance with some examples of the disclosure.
Figure 8:
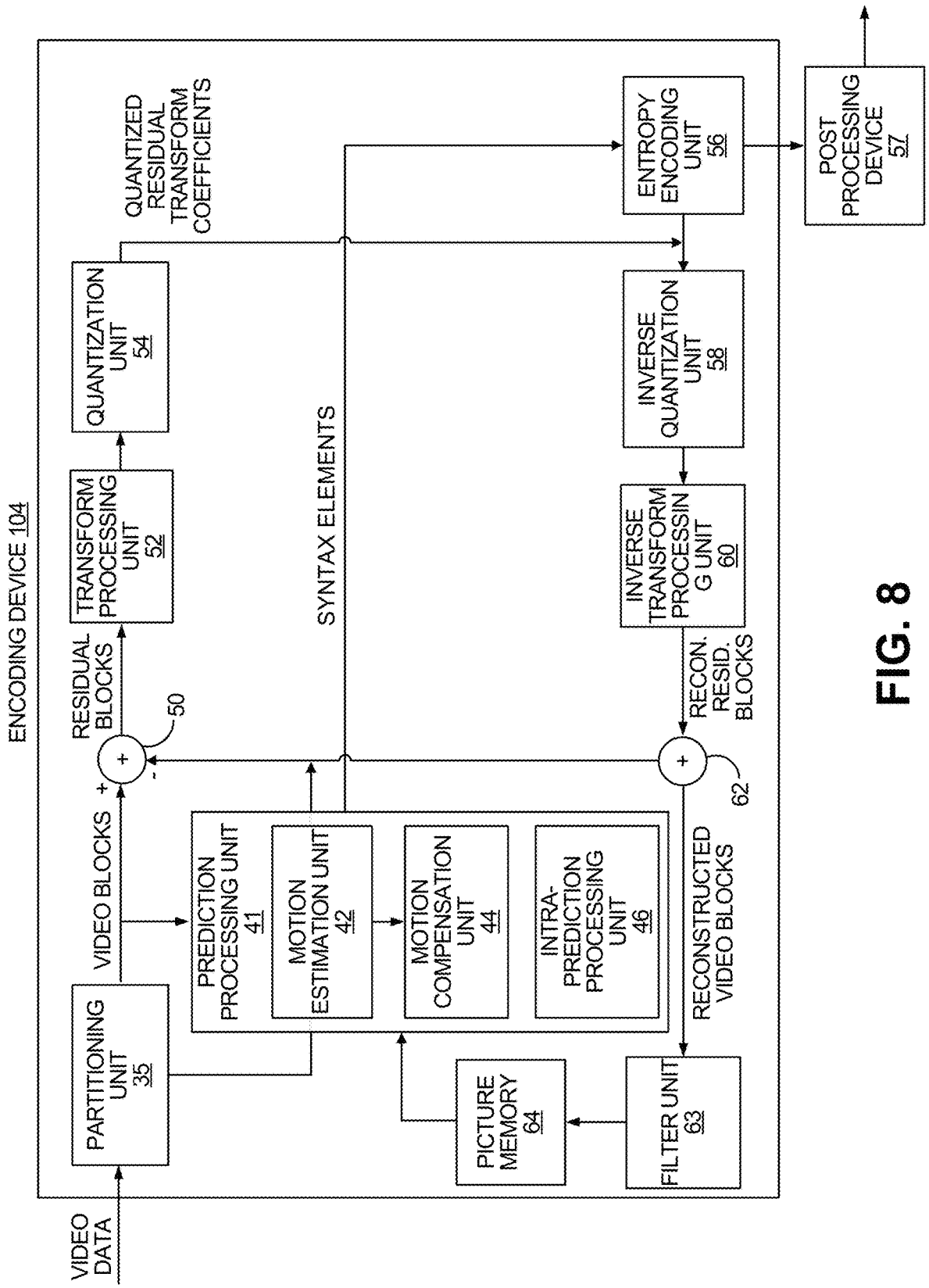
FIG. 8 is a block diagram illustrating an example encoding device, in accordance with some examples of the disclosure.
Figure 9:
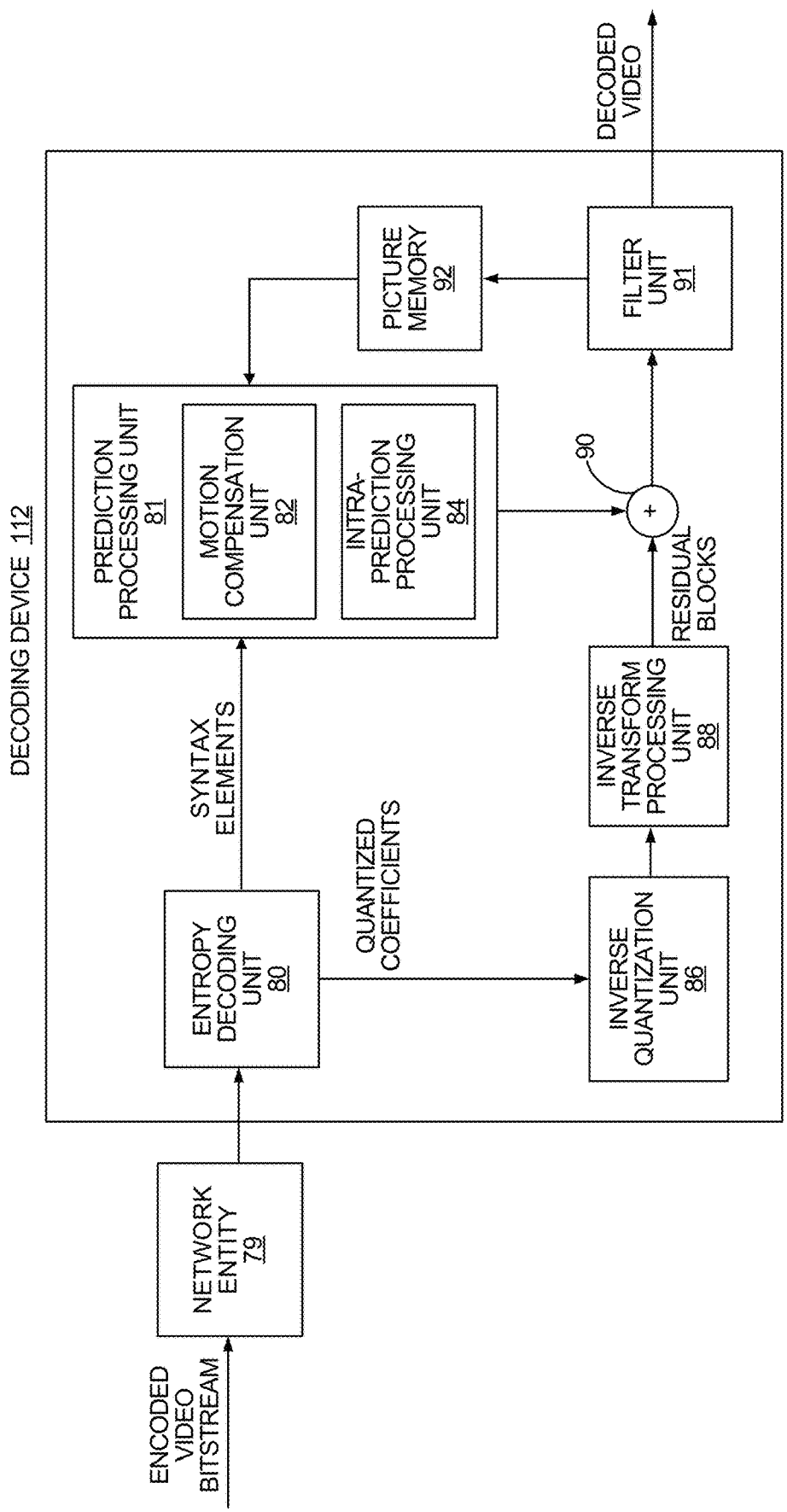
FIG. 9 is a block diagram illustrating an example video decoding device, in accordance with some examples of the disclosure.
Figure 10:
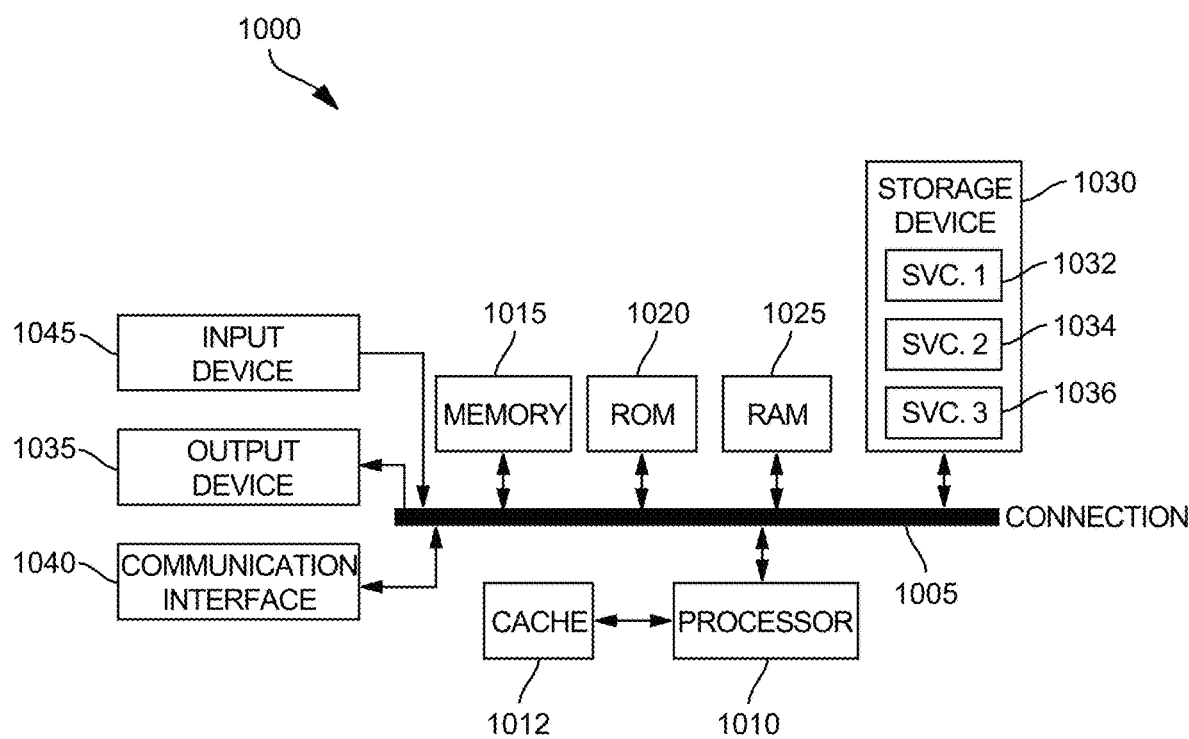
FIG. 10 illustrates an example computing device architecture, in accordance with some examples of the present disclosure.

The present technologies will be described in the following disclosure as follows. The discussion begins with a description of example systems, architectures, and technologies for efficient and effective control and data utilization between different hardware processing components, as illustrated in FIG. 1 through FIG. 6. A description of an example method for control and data utilization between hardware processing components, as illustrated in FIG. 7, will then follow. The discussion concludes with a description of an example encoding device architecture, an example decoding device architecture, and an example computing device architecture, as illustrated in FIGS. 8 through 10. The disclosure now turns to FIG. 1.

FIG. 1 is a block diagram illustrating an architecture of an example image capture and processing system 100. The image capture and processing system 100 can include various components used to capture and process images and/or videos, such as an image or video of a scene 110. The image capture and processing system 100 can capture images (e.g., still images or photographs) and/or videos, which can include multiple images (or frames) in a particular sequence. In some examples, the system 100 can include a lens 115 that faces a scene 110 and receives light from the scene 110. The lens 115 can bend the light toward an image sensor 130. The light received by the lens 115 can pass through an aperture controlled by one or more control mechanisms 120, and subsequently received by the image sensor 130.

The one or more control mechanisms 120 can control one or more features, components, mechanisms, operations, tasks, and/or settings such as, for example, exposure, focus, zoom, sharpness, bitrate, denoising, among others. For example, the control mechanisms 120 can include one or more exposure control mechanisms 125A, one or more focus control mechanisms 125B, and/or one or more zoom control mechanisms 125C. The one or more control mechanisms 120 may also include other control mechanisms, such as control mechanisms for controlling analog gain, flash, high dynamic range (HDR), depth of field, bitrate, image sharpness, denoising, and/or other image capture and/or processing properties. The one or more control mechanisms 120 can control features, mechanisms, components, and/or settings based on information from the image sensor 130, information from the image processor 150, and/or other information.

In some examples, the focus control mechanism 125B can obtain a focus setting and adjust the position of the lens 115 relative to the position of the image sensor 130 based on the focus setting. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the system 100, such as one or more microlenses over each photodiode of the image sensor 130. Each microlens can bend the light received from the lens 115 toward the corresponding photodiode before the light reaches the photodiode. The focus setting may be referred to as an image capture setting and/or an image processing setting.

The exposure control mechanism 125A can obtain, determine, and/or adjust one or more exposure settings. For example, based on the one or more exposure settings, the exposure control mechanism 125A can control a size of the aperture (e.g., aperture size), a duration of time for which the aperture is open (e.g., exposure time or shutter speed), a sensitivity of the image sensor 130 (e.g., ISO speed or film speed), analog gain applied by the image sensor 130, and/or any other exposure settings.

The zoom control mechanism 125C can obtain a zoom setting and, based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting.

The focus control mechanism 125B, exposure control mechanism 125A, and zoom control mechanism 125C in FIG. 1 are non-limiting illustrative examples of control mechanisms provided for explanation purposes. One of ordinary skill in the art will appreciate that the control mechanisms 120 can include any other control mechanism(s). For example, the control mechanisms 120 can include a control mechanism to control the bitrate implemented by the image processor 150 (and/or any components thereof), the sharpness of image data processed and/or output by the image processor 150 (and/or any components thereof), denoising implemented by the image processor 150 (and/or any components thereof), etc.

The image sensor 130 can include one or more arrays of photodiodes or other photosensitive elements. Each photodiode measures an amount of light that eventually corresponds to a particular pixel in an image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and/or may use different photodiodes throughout the array (in some cases vertically stacked). In some cases, different photodiodes in the array can have different spectral sensitivity curves, therefore responding to different wavelengths of light.

In some cases, the image sensor 130 can include a gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. In some examples, the image sensor 130 can include a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), and/or any other combination.

The image processor 150 may include one or more processors, such as one or more image signal processors (ISPs) 154, one or more processors 152, and/or one or more of any other type of processor discussed with respect to the computing device 1000 described with respect to FIG. 10. The processor 152 can include a digital signal processor (DSP) and/or other type of processor. In some implementations, the image processor 150 can include or be implemented by an integrated circuit or chip that includes the processor 152 and the image signal processor 154. In some cases, the chip can also include one or more input/output ports (e.g., input/output (I/O) ports 156), central processing units (CPUs), graphics processing units (GPUs), modems (e.g., 3G, 4G or LTE, 5G, etc.), memory, connectivity components (e.g., Bluetooth™, Global Positioning System (GPS), etc.), and/or other components and/or combination thereof.

The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB), any combination thereof, and/or other input/output port. In one illustrative example, the processor 152 can communicate with the image sensor 130 using an I2C port, and the image signal processor 154 can communicate with the image sensor 130 using a MIPI port.

The image processor 150 may perform a number of tasks such as, for example, demosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, image processing, image enhancement, computer vision, illumination, receipt of inputs, managing outputs, managing memory, HDR processing, extended reality, tracking, and/or any combination thereof. The image processor 150 may store image frames and/or processed images in memory 140 (e.g., random access memory (RAM), read-only memory (ROM), etc.), a cache, another storage device, and/or any other memory or storage component.

One or more input/output (I/O) devices 160 may be connected to the image processor 150. The I/O devices 160 can include a display screen, a keyboard, a keypad, a touchscreen, a trackpad, a touch-sensitive surface, a printer, and/or any other output devices, any other input devices, a communication interface, a peripheral device, and/or any combination thereof.

In some cases, the image capture and processing system 100 may be part of or may be implemented by a single device. In other cases, the image capture and processing system 100 may part of or may be implemented by two or more separate devices. In the example shown in FIG. 1, the image capture and processing system 100 includes an image capture device 105A (e.g., a camera device) and an image processing device 105B. In some examples, the image capture device 105A and the image processing device 105B can be part of or implemented by a same system or device. In other examples, the image capture device 105A and the image processing device 105B can be part of or implemented by separate systems or devices. For example, in some implementations, the image capture device 105A can include a camera device and the image processing device 105B can include a computing device, such as a mobile handset, a laptop computer, or other computing device.

In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

In the illustrative example shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the image signal processor 154 and the processor 152), the memory 140, and the I/O 160. In some cases, certain components illustrated in the image capture device 105A, such as the image signal processor 154 and/or the processor 152, may be included in the image capture device 105A or vice versa.

The image capture and processing system 100 can include an electronic device, such as a mobile or stationary telephone (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, an Internet-of-Things (IoT) thing, a smart wearable device (e.g., a smart watch, smart glasses, a head mounted display (HMD), etc.), an advanced driver-assistance system (ADAS), and/or any other suitable electronic device. In some examples, the image capture and processing system 100 can include one or more wireless transceivers for wireless communications, such as cellular network communications, 802.11 WIFI communications, and/or any other wireless communications.

While the image capture and processing system 100 is shown to include certain components, one of ordinary skill will appreciate that the image capture and processing system 100 can include other components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, field-programmable gate arrays (FPGAs), application-specific integrated circuits (ASICs), and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100. In some examples, the system 100 can include multiple subsystems, components, and/or processing pipelines that can perform computations in parallel.

Figure 2:
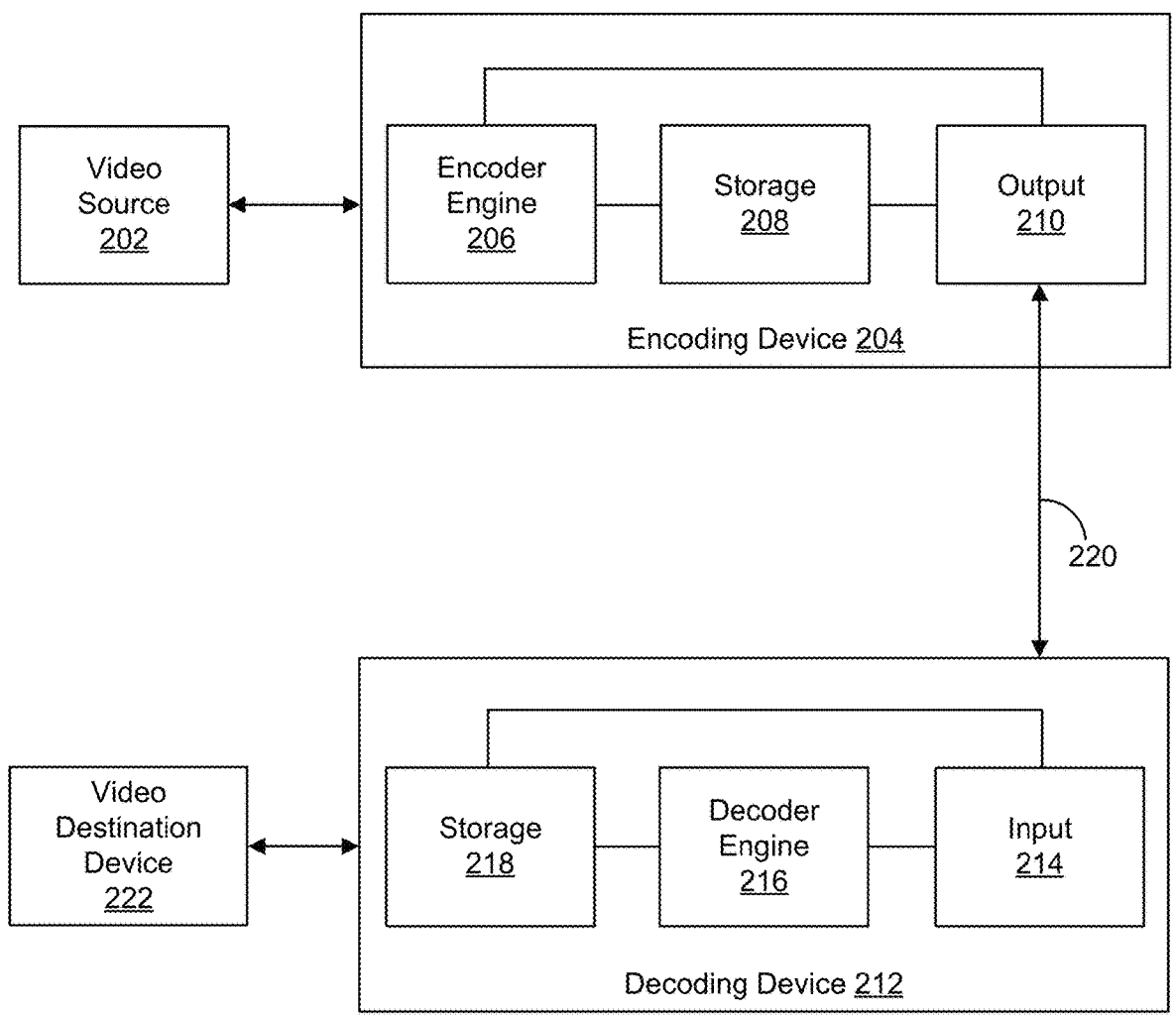
FIG. 2 is a block diagram illustrating an example of an encoding device and a decoding device, in accordance with some examples of the disclosure.

FIG. 2 is a block diagram illustrating an example system 200 including an encoding device 204 and a decoding device 212. The encoding device 204 and the decoding device 212 can be part of a same device or separate devices. In some examples, the encoding device 204 may be part of a source device, and the decoding device 212 may be part of a receiving device (also referred to as a client device). In some examples, the system 200, the encoding device 204, and/or the decoding device 212 can be part of and/or implemented by the system 100, the image capture device 105A, and/or an image processing device 105B. In other examples, the system 200, the encoding device 204, and/or the decoding device 212 can be part of and/or implemented by one or more other electronic devices.

The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, an Internet Protocol (IP) camera, a server device in a server system including one or more server devices (e.g., a video streaming server system, or other suitable server system), a head-mounted display (HMD), a heads-up display (HUD), smart glasses (e.g., virtual reality (VR) glasses, augmented reality (AR) glasses, or other smart glasses), or any other suitable electronic device.

The components of the system 200 can include and/or can be implemented using electronic circuits or other electronic hardware, which can include one or more programmable electronic circuits (e.g., microprocessors, graphics processing units (GPUs), digital signal processors (DSPs), central processing units (CPUs), FPGAs, ASICs, and/or other suitable electronic circuits), and/or can include and/or be implemented using computer software, firmware, or any combination thereof, to perform the various operations described herein. In some cases, the system 200 can include multiple subsystems and/or processing pipelines that can perform computations in parallel.

While the system 200 is shown to include certain components, one of ordinary skill will appreciate that the system 200 can include more or fewer components than those shown in FIG. 2. For example, the system 200 can also include, in some instances, one or more memory devices other than the storage 208 and the storage 218 (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 2.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. An encoding device 204 can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, and/or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The encoding device 204 may restrict the search to a certain spatial displacement from the block to be encoded. A best match may be located using a two-dimensional (2D) motion vector that includes a horizontal displacement component and a vertical displacement component. For intra-prediction modes, the encoding device 204 may form the predicted block using spatial prediction techniques based on data from previously encoded neighboring blocks within the same picture.

The encoding device 204 may determine a prediction error. For example, the prediction can be determined as the difference between the pixel values in the block being encoded and the predicted block. The prediction error can also be referred to as the residual. The encoding device 204 may also apply a transform to the prediction error using transform coding (e.g., using a form of a discrete cosine transform (DCT), a form of a discrete sine transform (DST), or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the encoding device 204 may entropy code syntax elements, thereby further reducing the number of bits needed for their representation.

A decoding device 212 may, using the syntax elements and control information discussed above, construct predictive data (e.g., a predictive block) for decoding a current frame. For example, the decoding device 212 may add the predicted block and the compressed prediction error. The decoding device 212 may determine the compressed prediction error by weighting the transform basis functions using the quantized coefficients. The difference between the reconstructed frame and the original frame is called reconstruction error.

The coding technologies described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 200 can support one-way or two-way video transmission to support applications such as video conferencing, video streaming, video playback, video broadcasting, gaming, extended reality (e.g., virtual reality, augmented reality, and the like), and/or video telephony, among others.

In some examples, the encoding device 204 can encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a joint exploration video team (JVET) to explore and develop new video coding tools for the next generation of video coding standard, named Versatile Video Coding (VVC). The reference software is called VVC Test Model (VTM). An objective of VVC is to provide a significant improvement in compression performance over the existing HEVC standard, aiding in deployment of higher-quality video services and emerging applications (e.g., such as 360° omnidirectional immersive multimedia, high-dynamic-range (HDR) video, among others). Essential Video Coding (EVC), VP9 and Alliance of Open Media (AOMedia) Video 1 (AV1) are other video coding standards for which the techniques described herein can be applied.

Many embodiments described herein can be performed using video codecs such as EVC, VTM, VVC, HEVC, AVC, and/or extensions thereof. However, the techniques and systems described herein may also be applicable to other coding standards or protocols, such as MPEG, JPEG (or other coding standard for still images), VP9, AV1, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 2, a video source 202 may provide the video data to the encoding device 204. The video source 202 may be part of the source device, or may be part of a device other than the source device. The video source 202 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 202 may include one or more input pictures. Pictures may also be referred to as "frames." A picture or frame is a still image that, in some cases, is part of a video. In some examples, data from the video source 202 can be a still image that is not a part of a video. In HEVC, VVC, and other video coding specifications, a video sequence can include a series of pictures. A picture may include three sample arrays, denoted $S_L$, $S_{Cb}$, and $S_{Cr}$. $S_L$ is a two-dimensional array of luma samples, $S_{Cb}$ is a two-dimensional array of Cb chrominance samples, and $S_{Cr}$ is a two-dimensional array of Cr chrominance samples. Chrominance samples may also be referred to herein as "chroma" samples. In other instances, a picture may be monochrome and may only include an array of luma samples.

The encoder engine 206 (or encoder) of the encoding device 204 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS.

An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. VCL NAL units include coded picture data forming a coded video bitstream. For example, a sequence of bits forming the coded video bitstream is present in VCL NAL units. A VCL NAL unit can include one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). In some cases, each slice or other portion of a bitstream can reference a single active PPS, SPS, and/or VPS to allow the decoding device 212 to access information that may be used for decoding the slice or other portion of the bitstream.

NAL units may contain a sequence of bits forming a coded representation of the video data (e.g., an encoded video bitstream, a CVS of a bitstream, or the like), such as coded representations of pictures in a video. The encoder engine 206 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction.

Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 206.

Once the pictures of the video data are partitioned into CUs, the encoder engine 206 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the encoder engine 206 and decoder engine 216 (described in more detail below) may be configured to operate according to VVC. According to VVC, a video coder (such as encoder engine 206 and/or decoder engine 216) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

In some examples, the one or more slices of a picture are assigned a slice type. Slice types include an intra-coded slice (I-slice), an inter-coded P-slice, and an inter-coded B-slice. An I-slice (intra-coded frames, independently decodable) is a slice of a picture that is only coded by intra-prediction, and therefore is independently decodable since the I-slice requires only the data within the frame to predict any prediction unit or prediction block of the slice. A P-slice (uni-directional predicted frames) is a slice of a picture that may be coded with intra-prediction and with uni-directional inter-prediction. Each prediction unit or prediction block within a P-slice is either coded with intra-prediction or inter-prediction. When the inter-prediction applies, the prediction unit or prediction block is only predicted by one reference picture, and therefore reference samples are only from one reference region of one frame. A B-slice (bi-directional predictive frames) is a slice of a picture that may be coded with intra-prediction and with inter-prediction (e.g., either bi-prediction or uni-prediction). A prediction unit or prediction block of a B-slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. There are a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra prediction mode and associated names

| Intra-prediction mode | Associated name |
|---|---|
| 0 | INTRA_PLANAR |
| 1 | INTRA_DC |
| 2 ... 34 | INTRA_ANGULAR2 ... INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture can be indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $y_0$, refIdx$_0$ and $\Delta x_1$, $y_1$, refIdx$_1$) can be used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $y_0$, refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

After performing prediction using intra- and/or inter-prediction, the encoding device 204 can perform transformation and quantization. For example, following prediction, the encoder engine 206 may calculate residual values corresponding to the PU. Residual values may include pixel difference values between the current block of pixels being coded (the PU) and the prediction block used to predict the current block (e.g., the predicted version of the current block). For example, after generating a prediction block (e.g., using inter-prediction or intra-prediction), the encoder engine 206 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform (DCT), discrete sine transform (DST), an integer transform, a wavelet transform, other suitable transform function, or any combination thereof. In some cases, one or more block transforms (e.g., a kernel of size 32×32, 16×16, 8×8, 4×4, or other suitable size) may be applied to residual data in each CU. In some examples, a TU may be used for the transform and quantization processes implemented by the encoder engine 206. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some examples following intra-predictive or inter-predictive coding using PUs of a CU, the encoder engine 206 may calculate residual data for the TUs of the CU. The PUs may include pixel data in the spatial domain (or pixel domain). As previously noted, the residual data may correspond to pixel difference values between pixels of the unencoded picture and prediction values corresponding to the PUs. The encoder engine 206 may form one or more TUs including the residual data for a CU (which includes the PUs), and may then transform the TUs to produce transform coefficients for the CU. The TUs may include coefficients in the transform domain following application of a block transform.

The encoder engine 206 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 206. In some examples, the encoder engine 206 may utilize a predefined scan order to scan the quantized transform coefficients to produce a serialized vector that can be entropy encoded. In some examples, encoder engine 206 may perform an adaptive scan. After scanning the quantized transform coefficients to form a vector (e.g., a one-dimensional vector), the encoder engine 206 may entropy encode the vector. For example, the encoder engine 206 may use context adaptive variable length coding, context adaptive binary arithmetic coding, syntax-based context-adaptive binary arithmetic coding, probability interval partitioning entropy coding, or another suitable entropy encoding technique.

The output 210 of the encoding device 204 may send the NAL units making up the encoded video bitstream data over the communications link 220 to the decoding device 212 of the receiving device. The input 214 of the decoding device 212 may receive the NAL units. The communications link 220 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 204 may store encoded video bitstream data in storage 208. The output 210 may retrieve the encoded video bitstream data from the encoder engine 206 or from the storage 208. Storage 208 may include any of a variety of distributed or locally accessed data storage media. For example, the storage 208 may include a hard drive, a storage disc, flash memory, volatile or non-volatile memory, or any other suitable digital storage media for storing encoded video data. The storage 208 can also include one or more buffers, such as a decoded picture buffer (DPB) for storing reference pictures for use in inter-prediction. In a further example, the storage 208 can correspond to a file server or another intermediate storage device that may store the encoded video generated by the source device. In such cases, the receiving device including the decoding device 212 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage 208 may be a streaming transmission, a download transmission, or a combination thereof.

The input 214 of the decoding device 212 receives the encoded video bitstream data and may provide the video bitstream data to the decoder engine 216, or to storage 218 for later use by the decoder engine 216. For example, the storage 218 can include a DPB for storing reference pictures for use in inter-prediction. The receiving device including the decoding device 212 can receive the encoded video data to be decoded via the storage 208. The encoded video data may be modulated according to a communication standard, such as a wireless communication protocol, and transmitted to the receiving device. The communication medium for transmitted the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 216 may decode the encoded video bitstream data by entropy decoding (e.g., using an entropy decoder) and extracting the elements of one or more coded video sequences making up the encoded video data. The decoder engine 216 may then rescale and perform an inverse transform on the encoded video bitstream data. Residual data is then passed to a prediction stage of the decoder engine 216. The decoder engine 216 then predicts a block of pixels (e.g., a PU). In some examples, the prediction is added to the output of the inverse transform (the residual data).

The video decoding device 212 may output the decoded video to a video destination device 222, which may include a display or other output device for displaying the decoded video data to a consumer of the content. In some aspects, the video destination device 222 may be part of the receiving device that includes the decoding device 212. In some aspects, the video destination device 222 may be part of a separate device other than the receiving device.

In some examples, the video encoding device 204 and/or the video decoding device 212 may be integrated with an audio encoding device and audio decoding device, respectively. The video encoding device 204 and/or the video decoding device 212 may also include other hardware or software to implement the coding techniques described above, such as one or more microprocessors, digital signal processors (DSPs), ASICs, FPGAs, discrete logic, software, hardware, firmware or any combinations thereof. The video encoding device 204 and the video decoding device 212 may be integrated as part of a combined encoder/decoder (codec) in a respective device.

The example system shown in FIG. 2 is one illustrative example that can be used herein. Techniques for processing video data using the technologies described herein can be performed by any digital video encoding and/or decoding device. Although some of the techniques of this disclosure are performed by a video encoding device, the techniques may also be performed by a combined video encoder-decoder, typically referred to as a "CODEC." Moreover, one or more of the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers usually represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

As described above, for each block, a set of motion information (also referred to herein as motion parameters) can be available. A set of motion information can contain motion information for forward and/or backward prediction directions. Here, forward and backward prediction directions are two prediction directions of a bi-directional prediction mode and the terms "forward" and "backward" do not necessarily have a geometry meaning. Instead, forward and backward can correspond to a reference picture list 0 (RefPicList0) and a reference picture list 1 (RefPicList1) of a current picture, slice, or block. In some examples, when only one reference picture list is available for a picture, slice, or block, only RefPicList0 is available and the motion information of each block of a slice is always forward. In some examples, RefPicList0 includes reference pictures that precede a current picture in time, and RefPicList1 includes reference pictures that follow the current picture in time. In some cases, a motion vector together with an associated reference index can be used in decoding processes. Such a motion vector with the associated reference index is denoted as a uni-predictive set of motion information.

For each prediction direction, the motion information can contain a reference index and a motion vector. In some cases, for simplicity, a motion vector can have associated information, from which it can be assumed that the motion vector has an associated reference index. A reference index can be used to identify a reference picture in the current reference picture list (RefPicList0 or RefPicList1). A motion vector can have a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A picture order count (POC) can be used in video coding standards to identify a display order of a picture. Although there are cases for which two pictures within one coded video sequence may have the same POC value, within one coded video sequence two pictures with the same POC value does not occur often. When multiple coded video sequences are present in a bitstream, pictures with a same POC value may be closer to each other in terms of decoding order. POC values of pictures can be used for reference picture list construction, derivation of a reference picture set as in HEVC, and/or motion vector scaling, among other things.

In H.264/AVC, each inter-macroblock (MB) may be partitioned into four different ways, including: one 16×16 macroblock partition; two 16×8 macroblock partitions; two 8×16 macroblock partitions; and four 8×8 macroblock partitions, among others. Different macroblock partitions in one macroblock may have different reference index values for each prediction direction (e.g., different reference index values for RefPicList0 and RefPicList1).

In some cases, when a macroblock is not partitioned into four 8×8 macroblock partitions, the macroblock can have only one motion vector for each macroblock partition in each prediction direction. In some cases, when a macroblock is partitioned into four 8×8 macroblock partitions, each 8×8 macroblock partition can be further partitioned into sub-blocks, each of which can have a different motion vector in each prediction direction. An 8×8 macroblock partition can be divided into sub-blocks in different ways, including: one 8×8 sub-block; two 8×4 sub-blocks; two 4×8 sub-blocks; and four 4×4 sub-blocks, among others. Each sub-block can have a different motion vector in each prediction direction. Therefore, a motion vector can be present in a level equal to or higher than a sub-block.

In HEVC, the largest coding unit in a slice is called a coding tree block (CTB) or coding tree unit (CTU). A CTB contains a quad-tree, the nodes of which are coding units. The size of a CTB can range from 16×16 pixels to 64×64 pixels in the HEVC main profile. In some cases, 8×8 pixel CTB sizes can be supported. A CTB may be recursively split into coding units (CU) in a quad-tree manner. A CU could be the same size as a CTB and as small as 8×8 pixels. In some cases, each coding unit is coded with one mode, such as either intra-prediction mode or inter-prediction mode. When a CU is inter-coded using an inter-prediction mode, the CU may be further partitioned into two or four prediction units (PUs), or may be treated as one PU when further partitioning does not apply. When two PUs are present in one CU, the two PUs can be half size rectangles or two rectangles that are ¼ or ¾ the size of the CU.

When the CU is inter-coded, one set of motion information can be present for each PU, which can be derived with a unique inter-prediction mode. For example, each PU can be coded with one inter-prediction mode to derive the set of motion information. In some cases, when a CU is intra-coded using intra-prediction mode, the PU shapes can be 2N×2N and N×N. Within each PU, a single intra-prediction mode is coded (while chroma prediction mode is signalled at the CU level). In some cases, the N×N intra PU shapes are allowed when the current CU size is equal to the smallest CU size defined in SPS.

For motion prediction in HEVC, there are two inter-prediction modes for a prediction unit (PU), including merge mode and advanced motion vector prediction (AMVP) mode. Skip is considered as a special case of merge. In either AMVP mode or merge mode, a motion vector (MV) candidate list is maintained for multiple motion vector predictors. The motion vector(s), as well as reference indices in the merge mode, of the current PU are generated by taking one candidate from the MV candidate list.

In some examples, the MV candidate list contains up to five candidates for the merge mode and two candidates for the AMVP mode. In other examples, different numbers of candidates can be included in a MV candidate list for merge mode and/or AMVP mode. A merge candidate may contain a set of motion information. For example, a set of motion information can include motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index needs to be explicitly signaled, together with an MV predictor (MVP) index to the MV candidate list since the AMVP candidate contains only a motion vector. In AMVP mode, the predicted motion vectors can be further refined.

A merge candidate may correspond to a full set of motion information, while an AMVP candidate may contain one motion vector for a specific prediction direction and a reference index. The candidates for both modes are derived similarly from the same spatial and temporal neighboring blocks.

In some examples, merge mode allows an inter-predicted PU to inherit the same motion vector or vectors, prediction direction, and reference picture index or indices from an inter-predicted PU that includes a motion data position selected from a group of spatially neighboring motion data positions and one of two temporally co-located motion data positions. For AMVP mode, motion vector or vectors of a PU can be predicatively coded relative to one or more motion vector predictors (MVPs) from an AMVP candidate list constructed by an encoder. In some instances, for single direction inter-prediction of a PU, the encoder can generate a single AMVP candidate list. In some instances, for bi-directional prediction of a PU, the encoder can generate two AMVP candidate lists, one using motion data of spatial and temporal neighboring PUs from the forward prediction direction and one using motion data of spatial and temporal neighboring PUs from the backward prediction direction.

The candidates for both modes can be derived from spatial and/or temporal neighboring blocks. Spatial MV candidates are derived from the neighboring blocks for a specific PU (PU0), although the methods generating the candidates from the blocks differ for merge and AMVP modes. In merge mode, the encoder can form a merging candidate list by considering merging candidates from various motion data positions.

In some cases, some of the data and computations used for image processing and video coding can be the same or similar. For example, various computations performed by an ISP (e.g., ISP 154) for image processing tasks are also performed by a video encoder (e.g., encoding device 204 and/or encoder engine 206) for video encoding (or are significantly similar to computations performed by a video encoder). In this example, a system (e.g., system 100) implementing an ISP for the image processing tasks and a video encoder for the video encoding will perform the one or more computations at each of the ISP and the video encoder. By performing the same computations multiple times, the system creates unnecessary computational redundancy, increases overall computational complexity, places an extra and unnecessary burden on system resources, and potentially affects system and application performance.

An illustrative example process often performed by both an ISP and a video encoder for their respective use is motion estimation. Motion estimation is used in image processing to perform artifact free filtering across frames. The ISP can use motion vectors calculated to align frames (e.g., pixels in frames) before performing filtering across time to avoid certain types of artifacts such as ghosting. As previously explained with respect to FIG. 2, motion estimation (and motion vectors) is also used by video encoders to remove temporal redundancies by encoding the residuals of temporally aligned blocks of pixels.

Another illustrative example process often used by both an ISP and a video encoder is face detection (and/or any object detection). The ISP can use face detection to, for example, target pixels corresponding to a face in an image and/or to perform automatic focus, automatic exposure and automatic gain (3 A) based on the facial region. In video compression, face detection can be used to encode a region of interest (ROI) where pixels in the facial region are compressed less than other pixels (e.g., background pixels, etc.) to provide a better perceptual quality of the image data.

Other non-limiting example computations and information often implemented by both the ISP and video encoder include segmentation, texture detection, edge detection, and feature detection, among others. Similar duplication of operations and data is also common in other contexts and applications. For example, ISPs and extended reality (XR) components often perform the same operations for different tasks. An ISP may perform various image processing computations that are also performed by an XR component for an XR application. Similarly, ISPs and advanced driver-assistance systems (ADAS) often perform the same operations for their respective tasks.

The technologies described herein provide techniques and architectures to reduce or eliminate duplicative computations performed by different components, devices, and/or subsystems of a device. In some examples, an example architecture can implement an engine that performs computations that are used by, common to, and/or needed by multiple components, devices, and/or subsystems of a device. The engine can provide the results of such computations to the different components, devices, and/or subsystems and avoid costly duplication of such computations across the different components, devices, and/or subsystems.

Figure 3:
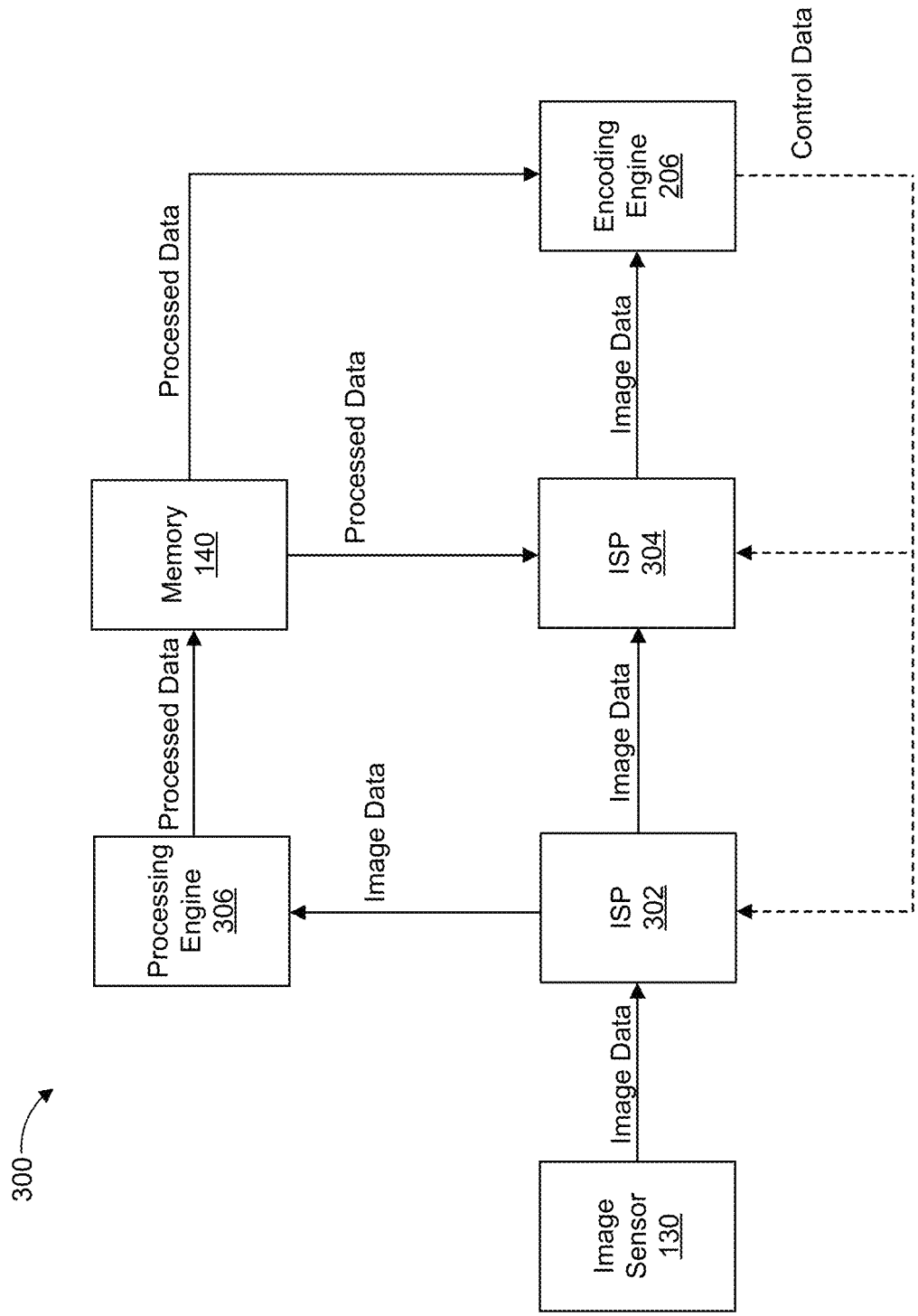
FIGS. 3 through 6 are diagrams illustrating example system flows of an architecture for reducing or eliminating redundant computations across different computing components, in accordance with some examples of the disclosure.

FIG. 3 is a diagram illustrating an example system flow 300 of an architecture for reducing or eliminating redundant computations across ISP and video encoder subsystems of a device. In some examples, the system flow 300 and architecture shown in FIG. 3 can be implemented by a system, such as system 100 shown in FIG. 1, implementing ISP and video encoding components for image processing and video compression. In some cases, the ISP 302 and/or the ISP 304 in FIG. 3 can be the same as the ISP 154 in FIG. 1. For example, the system 100 in FIG. 1 can implement an ISP 154 corresponding to ISP 302 and another ISP 154 corresponding to ISP 304.

The ISP 302 can send and receive data from the image sensor 130. For example, the ISP 302 can receive image data (e.g., raw pixel data) from the image sensor 130. The image data can include one or more images or frames captured by the image sensor 130. In some cases, the ISP 302 can send control information to the image sensor 130 to control and/or adjust one or more settings and/or mechanisms of the image sensor 130. For example, the ISP 302 can control and/or adjust automatic focus, automatic exposure and automatic gain settings and/or any other settings of the image sensor 130.

In some examples, the ISP 302 can operate as a "real time" ISP in the sense that the ISP 302 can receive and/or process image data from the image sensor 130 as it is captured and/or processed (e.g., in real time or significantly close to real time) by the image sensor 130 (and/or before being sent or stored by the image sensor 130 to/on a separate device or component), and/or in the sense that the ISP 302 and image sensor 130 are synchronized (e.g., have synchronized clocks and/or interact with each other according to a synchronized clock).

The ISP 302 can receive the image data from the image sensor 130 and provide the image data to the ISP 304 and the processing engine 306. In some cases, the ISP 302 can perform one or more image processing operations on the image data prior to providing the image data to the ISP 304 and the processing engine 306. For example, the ISP 302 can perform demosaicing, noise reduction, image scaling, and/or any image preprocessing operations on the image data prior to providing the image data to the ISP and the processing engine 306.

In some cases, the processing engine 306 can include a hardware engine implemented by one or more processors and/or integrated circuits, such as one or more general-purpose processors, ASICs, FPGAs, DSPs, ISPs, microcontrollers, processor cores, and/or the like. The processing engine 306 can process the image data from the ISP 302 to calculate information used by both the ISP 304 and the encoder engine 206. For example, the processing engine 306 can analyze the image data and use the image data to perform one or more operations needed and/or used by both the ISP 304 and the encoder engine 206. In some examples, the processing engine 306 can perform computations that are common to (e.g., that would otherwise be performed by) both the ISP 304 and the encoder engine 206. Instead of the ISP 304 and the encoder engine 206 performing duplicative computations on the image data, the processing engine 306 can perform such computations on behalf of the ISP 304 and the encoder engine 206.

Non-limiting example operations on the image data that can be performed by the processing engine 306 for the ISP 304 and the encoder engine 206 can include motion estimation, image detection (e.g., face detection, object detection, feature detection, texture detection, edge detection, etc.), segmentation, and/or any other computation that can be utilized by both the ISP 304 and the encoder engine 206 for their respective tasks.

The processing engine 306 can perform the one or more operations and generate processed data for the ISP 304 and the encoder engine 206. The processed data can include one or more outputs and/or results of operations performed by the processing engine 306 on the image data. For example, the processed data can include motion vectors, an image map (e.g., an object map, a feature map, etc.), texture information, and/or any other output data calculated for the image data by the processing engine 306.

The processing engine 306 can store the processed data on memory 140 for access by the ISP 304 and the encoder engine 206. In some examples, the processing engine 306 can provide the processed data to the ISP 304 and/or the encoder engine 206 before or without storing the processing data on the memory 140.

In some examples, the encoder engine 206 can receive image data from the ISP 304 and retrieve the processed data from memory 140 for use in processing the image data from the ISP 304. The encoder engine 206 can use the processed data for one or more of the operations and/or tasks performed by the encoder engine 206 on the image data from the ISP 304. For example, the encoder engine 206 can use the processed data for one or more coding operations. To illustrate, the encoder engine 206 can use motion vectors in the processed data to generate a compressed video stream from the image data.

In some cases, the encoder engine 206 can use motion vectors in the processed data to align frames (or pixels in frames) before performing filtering across time, in order to avoid artifacts such as ghosting. In other cases, the encoder engine 206 can use object detection information (e.g., face detection information or any other object detection information) or segmentation information in the processed data to encode a region of interest in video data, where pixels in a certain region are compressed less than pixels in other regions such as a background.

The image data from the ISP 304 can include data (e.g., one or more images or frames) captured by the image sensor 130. For example, the image data can include the image data received by the ISP 304 from the ISP 302 (with or without processing by the ISP 302 as previously described). In some cases, the ISP 304 can process the image data from the ISP 302 prior to providing the image data to the encoder engine 206. Such processing can be in addition to any processing performed by the ISP 302 on the image data, if any.

In some cases, the ISP 304 can perform more complicated and/or computationally intensive operations on data from the image sensor 130 than the ISP 302. For example, as previously explained, the ISP 302 can operate as a "real time" ISP. On the other hand, the ISP 304 can operate as an "offline" ISP in the sense that the ISP 304 does not as it is captured and processed by the image sensor 130 (e.g., in real time or near real time). In some examples, the ISP 304 can have more time to process image data it receives than the ISP 302 and/or can delay processing of such image data more than the ISP 302 without impacting (or with more limited impact) the flow of data and/or operations from the image sensor 130, and can therefore perform more complicated and/or computationally intensive operations on the image data.

Non-limiting examples of operations that the ISP 304 can perform on the image data prior to providing the image data to the encoder engine 206 can include three-dimensional (3D) denoising, edge preserving, up-scaling, facial processing, among others. The ISP 304 can also perform operations on the image data using the processing data from the processing engine 306. The ISP 304 can perform such operations on the same image data provided to the encoder engine 206 and/or other portions of image data that are not provided by the ISP 304 to the encoder engine 206.

In some examples, the ISP 304 can retrieve the processed data from the memory 140 and use the processed data to perform image processing operations. The ISP 304 can use the processed data from the processing engine 306 and the image data from the ISP 302 to perform, for example and without limitation, artifact free filtering across frames, face processing, frame rate up-conversion (FRUC), image effects (e.g., depth-of-field, image stylization, etc.), texture mapping, image enhancement, image filtering, modeling, automatic focus, automatic exposure, and automatic gain, and/or any other image processing operations.

In some examples, the encoder engine 206 can provide control data to the ISP 302 and/or the ISP 304, which the ISP 302 and/or the ISP 304 can use to adjust operations and/or settings at the ISP 302 and/or ISP 304 according to the control data. In some cases, the control data can be based on, and/or can indicate, specific preferences, capabilities, requirements, conditions, configurations, parameters, and/or operations at the encoder engine 206. For example, the control data can include bitrate or filtering parameters that the ISP 302 and/or the ISP 304 should apply and/or account for when processing and/or providing image data to the encoder engine 206. To illustrate, the encoder engine 206 can use the bitrate or bits per pixel (BPP) at the encoder engine 206 to determine a filtering level (which can include noise filtering) that the ISP 302 and/or the ISP 304 should apply to the image data. The encoder engine 206 can provide information regarding the filtering level (e.g., filtering parameters, BPP information, etc.) to the ISP 302 and/or the ISP 304 through the control data.

In some cases, when the bitrate or BPP at the encoder engine 206 is lower, the encoder engine 206 can request more aggressive filtering, and when the bitrate or BPP is higher, the encoder engine 206 can request less aggressive filtering. As another example, the encoder engine 206 can measure coding artifacts (e.g., blocking, ringing, etc.) and use the coding artifacts information to increase or decrease the sharpness of the image data produced by the ISP 302 and/or the ISP 304. As the artifacts increase, the encoder engine 206 can control (e.g., via the control data) the ISP 302 and/or the ISP 304 to perform further smoothening of the image data. In many cases, this can allow the encoder engine 206 to produce compressed video data of higher quality. In this way, the encoder engine 206 can adjust the processing and/or characteristics of the image data produced by the ISP 302 and/or 304 based on the capabilities of the encoder engine 206, parameters at the encoder engine 206, requirements at the encoder engine 206, conditions at the encoder engine 206, conditions and/or characteristics of the data and/or computations at the encoder engine 206, etc.

In some cases, the same processed data can be used by both the ISP 302 and the ISP 304 without additional adjustments in the data and/or the processing of the data, such as adjustments relative to the data and/or processing that would be implemented by the ISP 304 and/or the encoder engine 206 without the processing engine 306 (e.g., if the processing data was generated by the ISP 304 for specific use by the ISP 304 or by the encoder engine 206 for specific use by the encoder engine 206). In other cases, the encoder engine 206 and/or the ISP 304 may make certain adjustments to the processed data prior to using the processed data for a specific purpose. Alternatively, the processing engine 306 can generate the processed data in an adjusted and/or more general form that the ISP 304 and/or the encoder engine 206 can use without adjustments and/or can finalize according to their respective needs.

For example, in some cases, when the processing engine 306 generates motion estimation information for the ISP 304 and the encoder engine 206, the encoder engine 206 may need to make certain adjustments to implement the motion estimation information for the coding operations at the encoder engine 206. To illustrate, if the processing engine 306 generates optical flow information (e.g., per-pixel motion vectors) for the ISP 304 and the encoder engine 206, the encoder engine 206 can use the optical flow information to directly estimate block motion vectors for one or more frames by finding a most dominant motion vector. In some cases, the encoder engine 206 can find the most dominant motion vector using a median operation, for example.

In some examples, the encoder engine 206 can use a merged motion vector as a starting point for a motion search. The encoder engine 206 can refine the motion vector by performing more limited motion estimation that is restricted to a relatively smaller search range such as 4×4 pixels. In this example, the encoder engine 206 still performs some motion estimation. However, the processed data from the processing engine 306 can allow the encoder engine 206 to significantly reduce the amount of computations needed for the motion estimation.

In another example, the processing engine 306 can be used to estimate a global motion vector that may represent the motion of the image sensor 130. The encoder engine 206 can then use the global motion vector to offset the search space used when performing motion estimation. This can significantly improve the motion estimation quality without additional computations and/or computational burdens at the encoder engine 206.

In some cases, the encoder engine 206 can use motion vectors and texture information generated by the processing engine 306 (and included in the processed data) for look-ahead encoding. By having the motion information and texture information before encoding a frame, the encoder engine 206 can use an optimal rate allocation strategy. Such a rate allocation strategy can, for example, allocate an appropriate number of bits to a frame depending on the amount and type of motion and how it affects the objective and subjective quality of the coding output, and/or the level of texture information and how it is spread across the frame along with its effect on a subjective quality.

While the example system flow 300 is described above (and shown in FIG. 3) with respect to reducing or eliminating redundant computations across ISP and video encoder subsystems, the same or similar flow can be implemented to reduce or eliminate redundant computations across any other systems, components, and/or applications on a same device or different devices. Additional examples are described below with respect to FIGS. 4-6. The examples shown in FIGS. 3-6 are non-exhaustive, non-limiting illustrative examples.

Moreover, while the system flow 300 is described with respect to a processing engine 306 generating the processed data for the ISP 304 and the encoder engine 206, in other examples the processed data can be generated by a different component. For example, in some cases, the ISP 304 can generate the processed data for both the ISP 304 (and/or the operations performed by the ISP 304) and the encoder engine 206 (and/or the operations performed by the encoder engine 206). For example, the ISP 304 may use the image to generate the processed data and provide the processed data to the encoder engine 206 along with the image data. The ISP 304 and the encoder engine 206 can use the processed data for their respective operations. In this example, the ISP 302 may not need to provide the image data to the processing engine 306.

Figure 4:
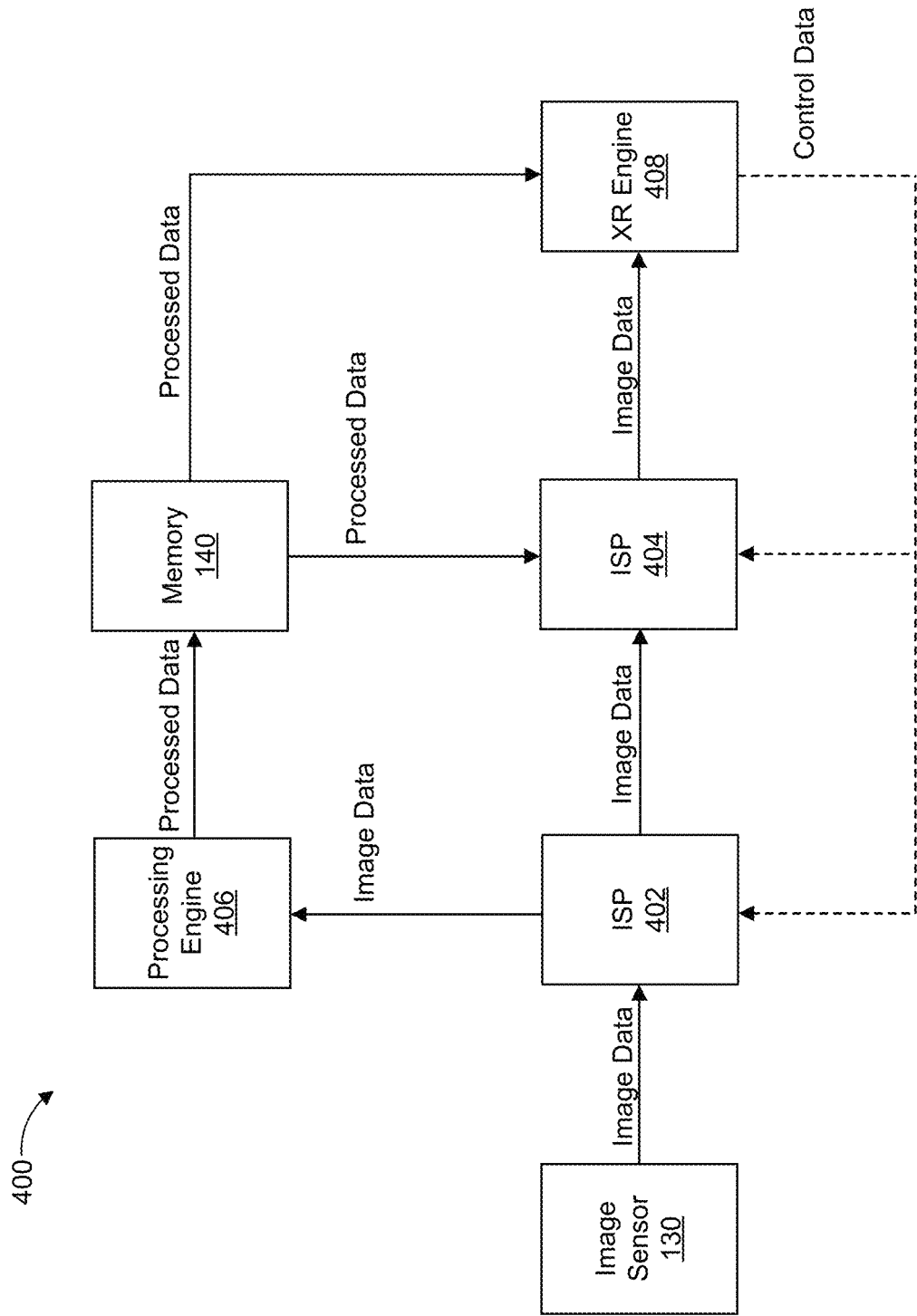

FIG. 4 is a diagram illustrating another example system flow 400 of an architecture for reducing or eliminating redundant computations across ISP and XR subsystems of a device. In this example, the ISP 402 receives image data from the image sensor 130 and provides the image data to the ISP 404 and the processing engine 406. As previously explained, the ISP 402 can provide the image data as received by the image sensor 130 or can perform one or more operations on the image data before providing the image data to the ISP 402 and the processing engine 406.

The processing engine 406 can use the image data from the ISP 402 to generate processed data for use by both the ISP 404 and the XR engine 408. The processed data can include any data that is relevant to both the ISP 404 and the XR engine 408 and/or that would otherwise be computed by both the ISP 404 and the XR engine 408. By producing the processed data, the processing engine 406 can eliminate and/or reduce duplicate operations that would otherwise be performed by the ISP 404 and the XR engine 408.

The XR engine 408 can be implemented by one or more processors and/or integrated circuits. The XR engine 408 can run one or more XR applications such as, for example, one or more virtual reality applications, augmented reality applications, and/or the like. The XR engine 408 can use the image data from the ISP 404 to generate XR content and XR experiences. The XR engine 408 can use the processed data for one or more operations on the image data used by the XR engine 408 to generate the XR content and/or XR experiences.

As previously described, the processed data generated by the processing engine 406 can include computed data that the ISP 404 and the XR engine 408 can both use for respective tasks and/or operations. For example, the processed data can include motion vectors, feature tracking information, object maps, 3D maps of a scene, depth information (e.g., depth from stereo and/or any other depth information), etc., that the XR engine 408 can use for XR operations and the ISP 404 can use for image processing operations.

The XR engine 408 can use the processed data for any XR operations such as, for example and without limitation, visual inertial odometry, obstacle avoidance, face detection, object detection, localization, etc. The ISP 404 can use the processed data for any image processing operations such as, for example and without limitation, filtering, image effects, 3 A, texture segmentation, 3D denoising, etc.

In some cases, the ISP 404 and the XR engine 408 can retrieve the processed data from memory 140. In other cases, the processing engine 406 can provide the processed data to the ISP 404 and/or the XR engine 408 without first storing the processed data in the memory 140 or in addition to storing the processed data in the memory 140.

In some examples, the XR engine 408 can provide control data to the ISP 402 and/or the ISP 404 to control one or more operations performed on the image data and/or one or more attributes of the processed image data. For example, the XR engine 408 can provide control data for adjusting an amount of sharpness or smoothening of the image data performed by the ISP 402 and/or the ISP 404. As another example, the XR engine 408 can provide control data to the ISP 404 to trigger the ISP 404 to perform one or more image processing operations on the image data prior to providing the image data to the XR engine 408. The one or more image processing operations can include specific operations for generating a particular image effect(s) and/or result(s) that the XR engine 408 can use for a certain XR operation and/or XR experience, and/or that can tailor the image data for certain needs, preferences, and/or requirements at the XR engine 408.

In some examples, the image sensor 130, the ISP 402, the ISP 404, the processing engine 406, the memory 140, and/or the XR engine 408 can be part of, or implemented by, a same electronic device. For example, the image sensor 130, the ISP 402, the ISP 404, the processing engine 406, the memory 140, and/or the XR engine 408 can be part of, or implemented by system 100 shown in FIG. 1. In other examples, the image sensor 130, the ISP 402, the ISP 404, the processing engine 406, the memory 140, and/or the XR engine 408 can be part of, or implemented by, two or more separate electronic devices.

Figure 5:
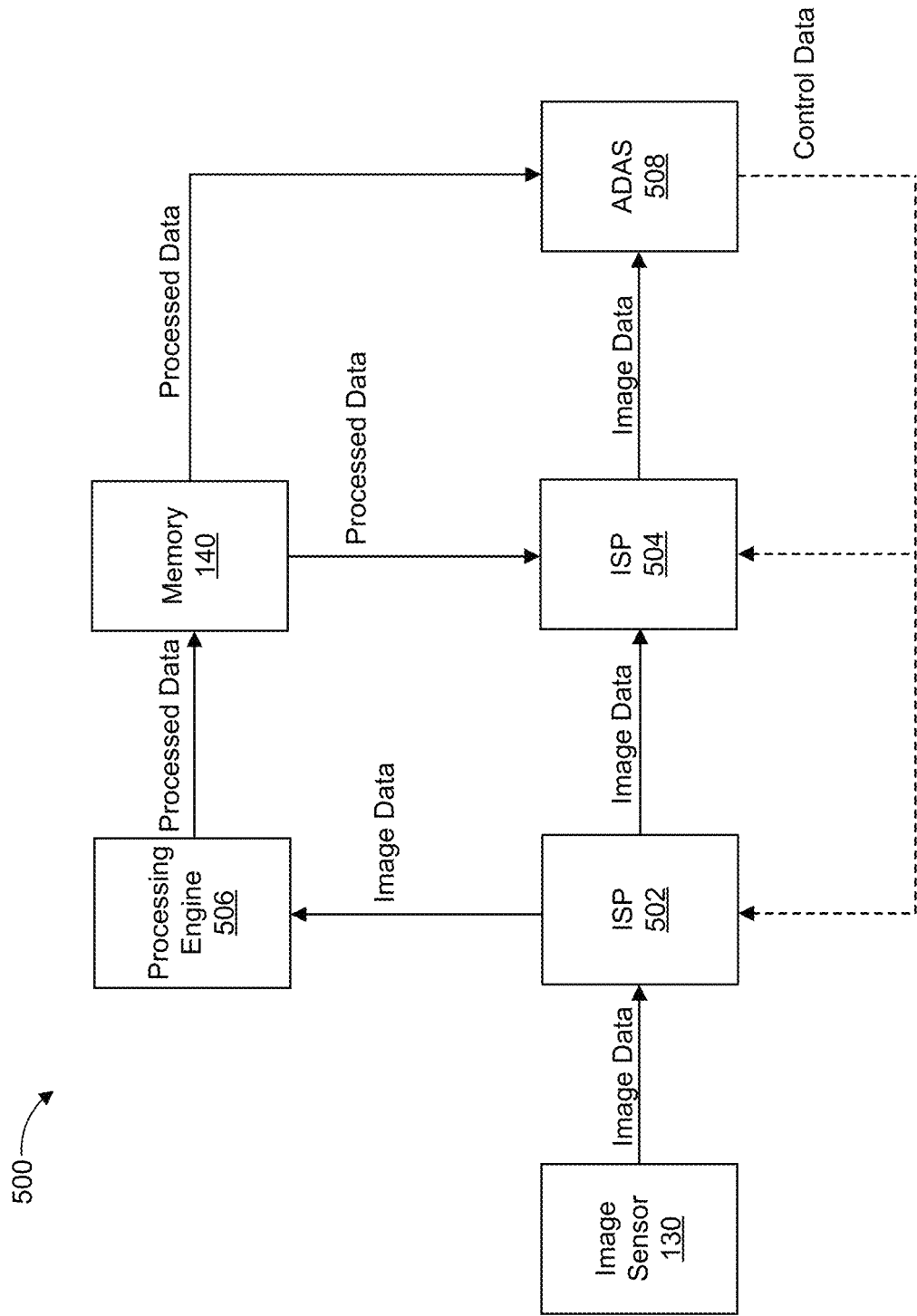

FIG. 5 is a diagram illustrating another example system flow 500 of an architecture for reducing or eliminating redundant computations at an ISP and an advanced driver-assistance system. In this example, the ISP 502 receives image data from the image sensor 130 and provides the image data to the ISP 504 and the processing engine 506. As previously explained, the ISP 502 can provide the image data as received by the image sensor 130 or can perform one or more operations on the image data before providing the image data to the ISP 502 and the processing engine 506.

The processing engine 506 can use the image data from the ISP 502 to generate processed data for use by both the ISP b 504 and the ADAS 508. The processed data can include any data that is relevant to both the ISP 504 and the ADAS 508 and/or that would otherwise be computed by both the ISP 504 and the ADAS 508. By producing the processed data, the processing engine 506 can eliminate and/or reduce duplicate operations that would otherwise be performed by the ISP 504 and the ADAS 508.

The ADAS 508 can be implemented by one or more processors and/or integrated circuits. The ADAS 508 can perform various autonomous driving and/or computer-assisted driving operations. Non-limiting examples of operations that can be implemented by the ADAS 508 include adaptive cruise control, automatic parking, automotive navigation, automotive night vision, blind spot monitoring, collision avoidance, speed estimation, distance estimation, pedestrian protection, 360-viewing, traffic sign recognition, wrong-way driving warning, and computer vision, among others.

The ADAS 508 can use the image data from the ISP 504 and the processed data from the processing engine 506 for one or more ADAS operations and/or functions. The processed data generated by the processing engine 506 can include computed data that the ISP 504 and the ADAS 508 can both use for respective tasks and/or operations. For example, the processed data can include motion vectors, feature tracking information, object maps, 3D maps of a scene, depth information (e.g., depth from stereo and/or any other depth information), object detection information (e.g., pedestrian detection, lane detection, traffic sign detection, etc.), etc., that the ADAS 508 can use for ADAS 508 operations and the ISP 504 can use for image processing operations.

The ADAS 508 can use the processed data for any ADAS operations such as, for example and without limitation, collision avoidance, pedestrian detection and/or avoidance, object detection, distance estimation, speed estimation, collision warning, etc. The ISP 504 can use the processed data for any image processing operations such as, for example and without limitation, filtering, image effects, 3 A, texture segmentation, 3D denoising, etc.

In some cases, the ISP 504 and the ADAS 508 can retrieve the processed data from memory 140. In other cases, the processing engine 506 can provide the processed data to the ISP 504 and/or the ADAS 508 without first storing the processed data in the memory 140 or in addition to storing the processed data in the memory 140.

In some examples, the ADAS 508 can provide control data to the ISP 502 and/or the ISP 504 to control one or more operations performed on the image data and/or one or more attributes of the processed image data. For example, the ADAS 508 can provide control data for adjusting an amount of sharpness or smoothening of the image data performed by the ISP 502 and/or the ISP 504. As another example, the ADAS 508 can provide control data to the ISP 504 to trigger the ISP 504 to perform one or more image processing operations on the image data prior to providing the image data to the ADAS 508. The one or more image processing operations can include specific operations for generating a particular image effect(s) and/or result(s) that the ADAS 508 can use for a certain ADAS operations, and/or that can tailor the image data for certain needs, preferences, and/or requirements of the ADAS 508.

In some examples, the image sensor 130, the ISP 502, the ISP 504, the processing engine 506, the memory 140, and/or the ADAS 508 can be part of, or implemented by, a same electronic device. For example, the image sensor 130, the ISP 502, the ISP 504, the processing engine 506, the memory 140, and/or the ADAS 508 can be part of, or implemented by system 100 shown in FIG. 1. In other examples, the image sensor 130, the ISP 502, the ISP 504, the processing engine 506, the memory 140, and/or the ADAS 508 can be part of, or implemented by, two or more separate electronic devices.

Figure 6:
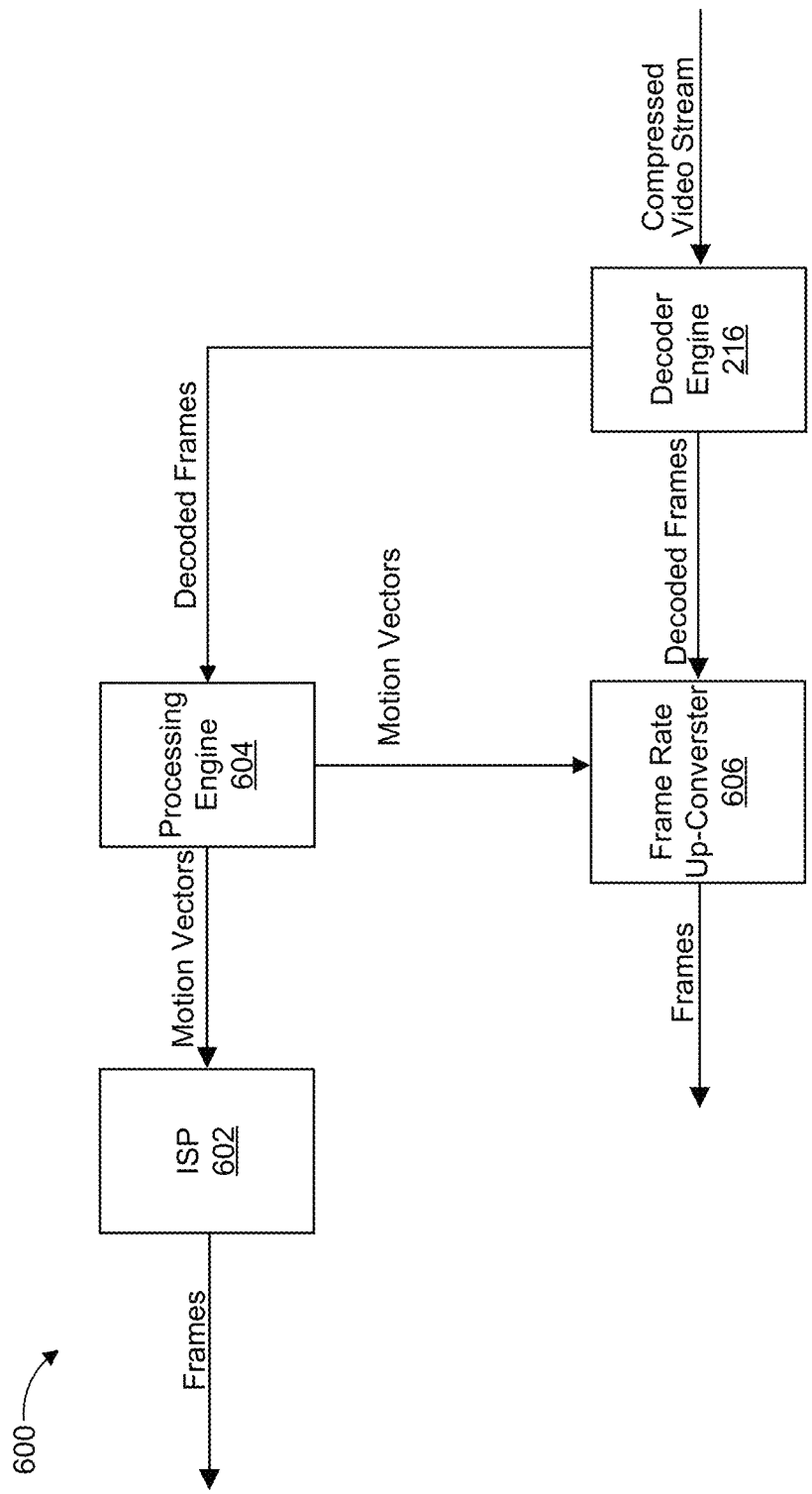

FIG. 6 is a diagram illustrating another example system flow 600 of an architecture for reducing or eliminating redundant computations across an ISP and a frame rate up-converter. In this example, the decoder engine 216 receives a compressed video stream from a source device such as, for example, encoding device 204, a storage device, or any other device.

The decoder engine 216 can decode the compressed video stream as further described herein, and generate decoded frames. The decoder engine 216 can provide the decoded frames to the processing engine 604 and a frame rate up-converter 606. In some examples, the decoder engine 216 can also provide the decoded frames to ISP 602.

The processing engine 604 can use the decoded frames to generate motion vectors for use by the frame rate up-converter 606 and the ISP 602. This way, instead of the ISP 602 and the frame rate up-converter 606 separately processing the decoded frames to calculate the motion vectors, the processing engine 604 can calculate the motion vectors for both the ISP 602 and the frame rate up-converter 606, and avoid the duplicative computations for generating the motion vectors.

The frame rate up-converter 606 can obtain the motion vectors generated by the processing engine 604 and use the motion vectors to perform frame rate up-conversion (FRUC) on the decoded frames. The frame rate up-converter 606 can perform the FRUC on the decoded frames and generate frames for display at a display device (and/or for storage for future display and/or processing). The ISP 602 can also obtain the motion vectors and use the motion vectors to perform one or more image processing operations, as previously described.

FIG. 7 is a flowchart illustrating an example process 700 for efficient control and data utilization between processing components of a system, such as system 100 shown in FIG. 1. At block 702, the process 700 can include obtaining image data captured by an image sensor (e.g., image sensor 130). The image data can include, for example, one or more frames. In some examples, the image data can be received from the image sensor by one or more processors on the system. For example, the image data can be received from the image sensor by an ISP (e.g., ISP 302 or ISP b 304) on the system.

In some examples, the image data can be received by a processing engine (e.g., processing engine 306) on the system. For example, the processing engine can receive the image data from one or more processors (e.g., ISP 302) on the system. The one or more processors can receive the image data from the image sensor or a separate device such as, for example, a storage or a server.

At block 704, prior to a first computing component (e.g., ISP 154, ISP 304, ISP 404, ISP 504, or ISP 602) performing a first set of operations on the image data and a second computing component (e.g., encoder engine 206, XR engine 408, ADAS 508, or frame rate up-converter 606) performing a second set of operations on the image data, the process 700 can include determining one or more common operations included in the first set of operations and the second set of operations. For example, the system can determine that the first set of operations and the second set of operations both include the one or more common operations and/or both use computation results generated by the one or more common operations.

In some examples, the system can determine that the first computing component needs to or will perform the one or more common operations as part of, or in performing, the first set of operations, and that the second computing component also needs to or will perform the one or more common operations as part of, or in performing, the second set of operations.

The first set of operations can be different than the second set of operations. For example, the first set of operations and the second set of operations can include one or more different operations (e.g., one or more operations that are not included in or performed through the first set of operations or the second set of operations). In some examples, the one or more common operations can include motion estimation, image segmentation, feature detection, and/or object detection (e.g., face detection and/or any object detection), and the output can include an object map, texture information, a segmentation result and/or one or more motion vectors.

At block 706, the process 700 can include performing the one or more common operations on the image data. In some examples, the one or more common operations can be performed by a component on the system that is separate and/or different from the first computing component and the second computing component. For example, the one or more common operations can be performed by a separate processing engine (e.g., processing engine 306, processing engine 406, processing engine 506, or processing engine 604) that performs the one or more common operations on behalf of the first computing device and the second computing device. In other examples, the one or more common operations can be performed by the first computing component on behalf of both of the first computing component and the second computing component (or vice versa).

At block 708, the process 700 can include generating an output of the one or more operations for use by the first computing component to perform the first set of operations and the second computing component to perform the second set of operations. In some cases, the output can include one or more computation results of the one or more common operations. In some aspects, the process 700 can include providing the output of the one or more operations to the first computing component, the second computing component, and one or more additional computing components. In some cases, the process 700 can include providing the output to the first computing component, the second computing component, and/or a storage (e.g., memory 140) accessible by the first computing component and the second computing component.

In some examples, the process 700 can include providing, by an image processor (e.g., ISP 154, ISP 302, ISP 402, or ISP 502), the image data to the first computing component (e.g., ISP 304, ISP 404, ISP 504, or ISP 602) and the second computing component (e.g., encoder engine 206, XR engine 408, ADAS 508, or frame rate up-converter 606); and receiving, from the second computing component, control data indicating one or more adjusted parameters for processing the additional image data prior to providing the additional image data to the second computing component. In some examples, the second computing component can provide the control data to the image processor and/or the first component.

In some cases, the one or more adjusted parameters can be based on resource capabilities associated with the second computing component (e.g., bandwidth, memory, etc.), one or more settings at the second computing component (e.g., bitrate, image data processing settings, coding settings, etc.), one or more errors at the second computing component, and/or one or more characteristics of a different output generated by the second computing component based on the second set of operations, the image data, and the output of the one or more operations. In some examples, the one or more adjusted parameters are based on a bitrate associated with the second computing component, and the one or more adjusted parameters indicate a filtering level for filtering the additional image data prior to providing the additional image data to the second computing component.

In some cases, the one or more adjusted parameters can be based on one or more distortions (e.g., coding artifacts, inaccurate pixel values, etc.) in a different output generated by the second computing component based on the second set of operations, the image data, and the output of the one or more operations, and the one or more adjusted parameters can indicate one or more image sharpening parameters for sharpening the additional image data prior to providing the additional image data to the second computing component.

In some examples, the first computing component can include an image processor (e.g., ISP 154, ISP 302, ISP 402, or ISP 502) and the second computing component can include a video encoder (e.g., encoding device 204 and/or encoder engine 206), an extended reality component (e.g., XR engine 408), a frame rate up-converter (e.g., frame rate up-converter 606), and/or one or more components of an advanced driver-assistance system (e.g., ADAS 508).

In some examples, the process 700 can include determining one or more types of results from the one or more common operations that the first computing component can use for the first set of operations and the second component can use for the second set of operations, and generate the output based on the one or more types of results. For example, the process 700 can include an output type and/or granularity, such as a type and/or granularity of motion estimation information, that the first and second computing devices can use for the first and second sets of operations.

In some examples, the first set of operations can include digital image processing operations, such as denoising, edge preserving, up-scaling, facial processing, segmentation, sharpening, object detection, filtering, etc. In some examples, the second set of operations can include video encoding operations (e.g., motion estimation, motion compensation, transformation, quantization, deblocking, entropy coding, etc.).

In some examples, the second set of operations can include extended reality operations. In some cases, the extended reality operations can include object detection, visual inertial odometry, obstacle avoidance, and/or face detection. In some examples, the second set of operations can include advanced driver-assistance system operations. In some cases, the advanced driver-assistance system operations can include, for example, speed estimation operations, distance estimation operations, collision avoidance operations, and/or collision detection operations.

In some cases, the image data can include a compressed video stream, and the second computing component can include a video decoder (e.g., decoding device 212 and/or decoding engine 216). In some examples, the second set of operations can include frame rate up-conversion operations.

In some examples, the first computing component can obtain the output of the one or more common operations and perform the first set of operations using the image data and the output of the one or more common operations. In some examples, prior to performing the first set of operations, the first computing component can refine the output for use in the first set of operations. For example, the first computing component can perform one or more additional computations using the output to generate a modified output prior to using the modified output for the first set of operations.

In some examples, the second computing component can obtain the output of the one or more common operations and perform the second set of operations using the image data and the output of the one or more common operations. In some examples, prior to performing the second set of operations, the second computing component can refine the output for use in the second set of operations.

In some cases, the second set of operations can include encoding the image data, In some examples, the second computing component can generate an encoded video bitstream based on the image data, the output of the one or more common operations, and the second set of operations. In some examples, the second computing component can transmit the encoded video bitstream. For example, the second computing component can transmit the encoded video bitstream to a decoder and/or any destination device.

In some examples, the processes described herein may be performed by a computing device or an apparatus, such as the system 100, the encoding device 104, the decoding device 112, and/or any other computing device. In some cases, the computing device or apparatus may include a processor, microprocessor, microcomputer, or other component of a device that is configured to carry out the steps of processes described herein. In some examples, the computing device or apparatus may include a camera configured to capture video data (e.g., a video sequence) including video frames. For example, the computing device may include a camera device, which may or may not include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface, transceiver, and/or transmitter configured to communicate the video data. The network interface, transceiver, and/or transmitter may be configured to communicate Internet Protocol (IP) based data or other network data.

The processes described herein can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 200). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices includes video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Specific details of the encoding device 104 and the decoding device 112 are shown in FIG. 8 and FIG. 9 respectively. FIG. 8 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 8 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 8, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

The encoding device 104 may perform any of the techniques described herein. Some techniques of this disclosure have generally been described with respect to the encoding device 104, but as mentioned above, some of the techniques of this disclosure may also be implemented by post processing device 57.

The encoding device 104 of FIG. 8 represents an example of a video encoder configured to perform one or more of the transform coding techniques described herein. The encoding device 104 may perform any of the techniques described herein, including the process described above with respect to FIG. 7.

FIG. 9 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 8.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or dequantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 9 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 2.

The decoding device 112 of FIG. 9 represents an example of a video decoder configured to perform one or more of the transform coding techniques described herein. The decoding device 112 may perform any of the techniques described herein, including the process 700 described above with respect to FIG. 7.

FIG. 10 illustrates an example computing device architecture 1000 of an example computing device which can implement various techniques described herein. For example, the computing device architecture 1000 can implement at least some portions of the system 100 shown in FIG. 1, and perform the operations and techniques described herein. The components of the computing device architecture 1000 are shown in electrical communication with each other using a connection 1005, such as a bus. The example computing device architecture 1000 includes a processing unit (CPU or processor) 1010 and a computing device connection 1005 that couples various computing device components including the computing device memory 1015, such as read only memory (ROM) 1020 and random access memory (RAM) 1025, to the processor 1010.

The computing device architecture 1000 can include a cache of high-speed memory connected directly with, in close proximity to, or integrated as part of the processor 1010. The computing device architecture 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other computing device memory 1015 may be available for use as well. The memory 1015 can include multiple different types of memory with different performance characteristics.

The processor 1010 can include any general purpose processor and a hardware or software service, such as service (1) 1032, service (2) 1034, and service (3) 1036 stored in storage device 1030, configured to control the processor 1010 as well as a special-purpose processor where software instructions are incorporated into the processor design. The processor 1010 may be a self-contained system, containing multiple cores or processors, a bus, memory controller, cache, etc. A multi-core processor may be symmetric or asymmetric.

To enable user interaction with the computing device architecture 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art, such as a display, projector, television, speaker device. In some instances, multimodal computing devices can enable a user to provide multiple types of input to communicate with the computing device architecture 1000. The communication interface 1040 can generally govern and manage the user input and computing device output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1105, read only memory (ROM) 1020, and hybrids thereof. The storage device 1030 can include services 1032, 1034, 1036 for controlling the processor 1010. Other hardware or software modules are contemplated. The storage device 1030 can be connected to the computing device connection 1005. In one aspect, a hardware module that performs a particular function can include the software component stored in a computer-readable medium in connection with the necessary hardware components, such as the processor 1010, connection 1005, output device 1035, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the subject matter of this application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative examples of the disclosure include:

Aspect 1: A method for processing video data, the method comprising: obtaining image data captured by an image sensor; prior to a first computing component performing a first set of operations on the image data and a second computing component performing a second set of operations on the image data, determining one or more common operations included in the first set of operations and the second set of operations, wherein the first set of operations is different than the second set of operations; performing the one or more common operations on the image data; and generating an output of the one or more operations for use by the first computing component to perform the first set of operations and the second computing component to perform the second set of operations.

Aspect 2: The method of Aspect 1, further comprising: providing the output to at least one of the first computing component, the second computing component, and a storage accessible by the first computing component and the second computing component.

Aspect 3: The method of any of Aspects 1 to 2, further comprising: providing, by an image processor, additional image data to at least one of the first computing component and the second computing component; and receiving, from the second computing component, control data indicating one or more adjusted parameters for processing the additional image data prior to providing the additional image data to the second computing component, the one or more adjusted parameters being received by at least one of the image processor and the first computing component.

Aspect 4: The method of Aspect 3, wherein the one or more adjusted parameters are based on at least one of resource capabilities associated with the second computing component, one or more settings at the second computing component, one or more errors at the second computing component, and one or more characteristics of a different output generated by the second computing component based on the second set of operations, the image data, and the output of the one or more operations.

Aspect 5: The method of any of Aspects 3 to 4, wherein the one or more adjusted parameters are based on a bitrate associated with the second computing component, and wherein the one or more adjusted parameters indicate a filtering level for filtering the additional image data.

Aspect 6: The method of any of Aspects 3 to 5, wherein the one or more adjusted parameters are based on one or more distortions in a different output generated by the second computing component based on the second set of operations, the image data, and the output of the one or more operations, and wherein the one or more adjusted parameters indicate one or more image sharpening parameters for sharpening the additional image data.

Aspect 7: The method of any of Aspects 1 to 6, wherein the first computing component comprises an image processor and the second computing component comprises at least one of a video encoder, an extended reality component, a frame rate up-converter, and one or more components of an advanced driver-assistance system.

Aspect 8: The method of any of Aspects 1 to 7, further comprising: determining one or more types of results from the one or more common operations that the first computing component can use for the first set of operations and the second component can use for the second set of operations; and generating the output based on the one or more types of results.

Aspect 9: The method of any of Aspects 1 to 8, wherein the first set of operations comprises digital image processing operations, wherein the second set of operations comprises video encoding operations.

Aspect 10: The method of any of Aspects 1 to 9, wherein the first set of operations comprises digital image processing operations, and wherein the second set of operations comprises extended reality operations, the extended reality operations comprising at least one of object detection operations, visual inertial odometry operations, obstacle avoidance operations, and face detection operations.

Aspect 11: The method of any of Aspects 1 to 10, wherein the first set of operations comprises digital image processing operations, and wherein the second set of operations comprise advanced driver-assistance system operations, the advanced driver-assistance system operations comprising at least one of speed estimation operations, distance estimation operations, collision avoidance operations, and collision detection operations.

Aspect 12: The method of any of Aspects 1 to 11, wherein the image data comprises a compressed video stream, wherein the second computing component comprises a video decoder, and wherein the second set of operations comprises frame rate up-conversion operations.

Aspect 13: The method of any of Aspects 1 to 12, wherein the one or more common operations comprise at least one of motion estimation, image segmentation, and object detection, and wherein the output comprises at least one of an object map, texture information, and one or more motion vectors.

Aspect 14: The method of any of Aspects 1 to 13, further comprising: obtaining, via the second computing component, the output of the one or more common operations; and performing, via the second computing component, the second set of operations using the image data and the output of the one or more common operations.

Aspect 15: The method of Aspect 14, further comprising: prior to performing the second set of operations, refining, via the second computing component, the output for use in the second set of operations.

Aspect 16: The method of any of Aspects 1 to 15, wherein the second set of operations comprises encoding the image data, the method further comprising: generating, via the second computing component, an encoded video bitstream based on the image data, the output of the one or more common operations, and the second set of operations.

Aspect 17: The method of Aspect 16, further comprising: transmitting, via the second computing component, the encoded video bitstream.

Aspect 18: The method of any of Aspects 1 to 17, further comprising: providing the output of the one or more operations to the first computing component, the second computing component, and one or more additional computing components.

Aspect 19: An apparatus for processing video data, the apparatus comprising memory and one or more processors coupled to the memory, the one or more processors being configured to: obtain image data captured by an image sensor; prior to a first computing component performing a first set of operations on the image data and a second computing component performing a second set of operations on the image data, determine one or more common operations included in the first set of operations and the second set of operations, wherein the first set of operations is different than the second set of operations; perform the one or more common operations on the image data; and generate an output of the one or more operations for use by the first computing component to perform the first set of operations and the second computing component to perform the second set of operations.

Aspect 20: The apparatus of Aspect 19, wherein the one or more processors are configured to: provide the output to at least one of the first computing component, the second computing component, and a storage accessible by the first computing component and the second computing component.

Aspect 21: The apparatus of any of Aspects 19 to 20, wherein the one or more processors are configured to: provide, by an image processor, additional image data to at least one of the first computing component and the second computing component; and receive, from the second computing component, control data indicating one or more adjusted parameters for processing the additional image data prior to providing the additional image data to the second computing component, the one or more adjusted parameters being received by at least one of the image processor and the first computing component.

Aspect 22: The apparatus of Aspect 21, wherein the one or more adjusted parameters are based on at least one of resource capabilities associated with the second computing component, one or more settings at the second computing component, one or more errors at the second computing component, and one or more characteristics of a different output generated by the second computing component based on the second set of operations, the image data, and the output of the one or more operations.

Aspect 23: The apparatus of any of Aspects 21 to 22, wherein the one or more adjusted parameters are based on a bitrate associated with the second computing component, and wherein the one or more adjusted parameters indicate a filtering level for filtering the additional image data.

Aspect 24: The apparatus of any of Aspects 21 to 23, wherein the one or more adjusted parameters are based on one or more distortions in a different output generated by the second computing component based on the second set of operations, the image data, and the output of the one or more operations, and wherein the one or more adjusted parameters indicate one or more image sharpening parameters for sharpening the additional image data.

Aspect 25: The apparatus of any of Aspects 19 to 24, wherein the first computing component comprises an image processor and the second computing component comprises at least one of a video encoder, an extended reality component, a frame rate up-converter, and one or more components of an advanced driver-assistance system.

Aspect 26: The apparatus of any of Aspects 19 to 25, wherein the one or more processors are configured to: determine one or more types of results from the one or more common operations that the first computing component can use for the first set of operations and the second component can use for the second set of operations; and generate the output based on the one or more types of results.

Aspect 27: The apparatus of any of Aspects 19 to 26, wherein the first set of operations comprises digital image processing operations, wherein the second set of operations comprises video encoding operations.

Aspect 28: The apparatus of any of Aspects 19 to 27, wherein the first set of operations comprises digital image processing operations, and wherein the second set of operations comprises extended reality operations, the extended reality operations comprising at least one of object detection operations, visual inertial odometry operations, obstacle avoidance operations, and face detection operations.

Aspect 29: The apparatus of any of Aspects 19 to 28, wherein the first set of operations comprises digital image processing operations, and wherein the second set of operations comprise advanced driver-assistance system operations, the advanced driver-assistance system operations comprising at least one of speed estimation operations, distance estimation operations, collision avoidance operations, and collision detection operations.

Aspect 30: The apparatus of any of Aspects 19 to 29, wherein the image data comprises a compressed video stream, wherein the second computing component comprises a video decoder, and wherein the second set of operations comprises frame rate up-conversion operations.

Aspect 31: The apparatus of any of Aspects 19 to 30, wherein the one or more common operations comprise at least one of motion estimation, image segmentation, and object detection, and wherein the output comprises at least one of an object map, texture information, and one or more motion vectors.

Aspect 32: The apparatus of any of Aspects 19 to 31, wherein the second computing component is configured to: obtain the output of the one or more common operations; and perform the second set of operations using the image data and the output of the one or more common operations.

Aspect 33: The apparatus of Aspect 32, wherein the second computing component is configured to: prior to performing the second set of operations, refine the output for use in the second set of operations.

Aspect 34: The apparatus of any of Aspects 19 to 33, wherein the second set of operations comprises encoding the image data, wherein the second computing component is configured to: generate an encoded video bitstream based on the image data, the output of the one or more common operations, and the second set of operations.

Aspect 35: The apparatus of Aspect 34, wherein the second computing component is configured to: transmit the encoded video bitstream.

Aspect 36: The apparatus of any of Aspects 19 to 35, wherein the apparatus is a mobile device.

Aspect 37: The apparatus of any of Aspects 19 to 36, further comprising a camera configured to capture one or more frames.

Aspect 38: The apparatus of any of Aspects 19 to 37, further comprising a display configured to display one or more frames.

Aspect 39: The apparatus of any of Aspects 19 to 36, wherein the one or more processors are configured to: provide the output of the one or more operations to the first computing component, the second computing component, and one or more additional computing components.

Aspect 40: A non-transitory computer-readable medium having stored thereon instructions which, when executed by one or more processors, cause the one or more processors to perform operations according to any of Aspects 1 to 38.

Aspect 41: An apparatus comprising means for performing operations according to any of Aspects 1 to 38.

What is claimed is:

1. An apparatus for processing video data, the apparatus comprising:
   memory; and
   one or more processors coupled to the memory, the one or more processors being configured to:
      obtain image data captured by an image sensor;
      determine one or more duplicated operations that are the same between a first set of operations of a first computing component and a second set of operations of a second computing component, wherein the one or more duplicated operations include a first subset of the first set of operations of the first computing component and a first subset of the second set of operations of the second computing component, the first set of operations being different than the second set of operations;
      perform the one or more duplicated operations on the image data; and
      generate an output of the one or more duplicated operations for use by the first computing component to perform a second subset of the first set of operations and the second computing component to perform a second subset of the second set of operations, wherein the second subset of the first set of operations and the second subset of the second set of operations do not include the one or more duplicated operations.

2. The apparatus of claim 1, wherein the one or more processors are configured to:
   provide the output to at least one of the first computing component, the second computing component, or a storage accessible by the first computing component and the second computing component.

3. The apparatus of claim 1, wherein the one or more processors are configured to:
   provide, by an image processor, additional image data to at least one of the first computing component or the second computing component; and
   receive, from the second computing component, control data indicating one or more adjusted parameters for processing the additional image data prior to providing the additional image data to the second computing component, the one or more adjusted parameters being received by at least one of the image processor or the first computing component.

4. The apparatus of claim 3, wherein the one or more adjusted parameters are based on at least one of resource capabilities associated with the second computing component, one or more settings at the second computing component, one or more errors at the second computing component, or one or more characteristics of a different output generated by the second computing component based on at least a portion of the second set of operations, the image data, and the output of the one or more duplicated operations.

5. The apparatus of claim 3, wherein the one or more adjusted parameters are based on a bitrate associated with the second computing component, and wherein the one or more adjusted parameters indicate a filtering level for filtering the additional image data.

6. The apparatus of claim 3, wherein the one or more adjusted parameters are based on one or more distortions in a different output generated by the second computing component based on at least a portion of the second set of operations, the image data, and the output of the one or more duplicated operations, and wherein the one or more adjusted parameters indicate one or more image sharpening parameters for sharpening the additional image data.

7. The apparatus of claim 1, wherein the first computing component comprises an image processor and the second computing component comprises at least one of a video encoder, an extended reality component, a frame rate up-converter, or one or more components of an advanced driver-assistance system.

8. The apparatus of claim 1, wherein the one or more processors are configured to:
   determine one or more types of results from the one or more duplicated operations for the first computing component to use for the second subset of the first set of operations and for the second computing component to use for the second subset of the second set of operations; and
   generate the output based on the one or more types of results.

9. The apparatus of claim 1, wherein the first set of operations comprises digital image processing operations, wherein the second set of operations comprises video encoding operations.

10. The apparatus of claim 1, wherein the first set of operations comprises digital image processing operations, and wherein the second set of operations comprises extended reality operations, the extended reality operations comprising at least one of object detection operations, visual inertial odometry operations, obstacle avoidance operations, or face detection operations.

11. The apparatus of claim 1, wherein the first set of operations comprises digital image processing operations, and wherein the second set of operations comprise advanced driver-assistance system operations, the advanced driver-assistance system operations comprising at least one of speed estimation operations, distance estimation operations, collision avoidance operations, or collision detection operations.

12. The apparatus of claim 1, wherein the image data comprises a compressed video stream, wherein the second computing component comprises a video decoder, and wherein the second set of operations comprises frame rate up-conversion operations.

13. The apparatus of claim 1, wherein the one or more duplicated operations comprise at least one of motion estimation, image segmentation, or object detection, and wherein the output comprises at least one of an object map, texture information, or one or more motion vectors.

14. The apparatus of claim 1, wherein the second computing component is configured to:
   obtain the output of the one or more duplicated operations; and
   perform the second subset of the second set of operations using the image data and the output of the one or more duplicated operations.

15. The apparatus of claim 14, wherein the second computing component is configured to:
   prior to performing the second subset of the second set of operations, refine the output for use in the second subset of the second set of operations.

16. The apparatus of claim 1, wherein the second subset of the second set of operations comprises encoding the image data, wherein the second computing component is configured to:
   perform the second subset of the second set of operations to generate an encoded video bitstream based on the image data and the output of the one or more duplicated operations.

17. The apparatus of claim 16, wherein the second computing component is configured to:
    transmit the encoded video bitstream.
18. The apparatus of claim 1, wherein the apparatus is a mobile device.
19. The apparatus of claim 1, wherein the one or more processors are configured to:
    provide the output of the one or more duplicated operations to the first computing component, the second computing component, and one or more additional computing components.
20. A method for processing video data, the method comprising:
    obtaining image data captured by an image sensor;
    determining one or more duplicated operations that are the same between a first set of operations of a first computing component and a second set of operations of a second computing component, wherein the one or more duplicated operations include a first subset of the first set of operations of the first computing component and a first subset of the second set of operations of the second computing component, the first set of operations being different than the second set of operations;
    performing the one or more duplicated operations on the image data; and
    generating an output of the one or more duplicated operations for use by the first computing component to perform a second subset of the first set of operations and the second computing component to perform a second subset of the second set of operations, wherein the second subset of the first set of operations and the second subset of the second set of operations do not include the one or more duplicated operations.
21. The method of claim 20, further comprising:
    providing the output to at least one of the first computing component, the second computing component, or a storage accessible by the first computing component and the second computing component.
22. The method of claim 20, further comprising:
    providing, by an image processor, additional image data to at least one of the first computing component or the second computing component; and
    receiving, from the second computing component, control data indicating one or more adjusted parameters for processing the additional image data prior to providing the additional image data to the second computing component, the one or more adjusted parameters being received by at least one of the image processor or the first computing component.
23. The method of claim 22, wherein the one or more adjusted parameters are based on at least one of resource capabilities associated with the second computing component, one or more settings at the second computing component, one or more errors at the second computing component, or one or more characteristics of a different output generated by the second computing component based on at least a portion of the second set of operations, the image data, and the output of the one or more duplicated operations.
24. The method of claim 22, wherein the one or more adjusted parameters are based on a bitrate associated with the second computing component, and wherein the one or more adjusted parameters indicate a filtering level for filtering the additional image data.
25. The method of claim 22, wherein the one or more adjusted parameters are based on one or more distortions in a different output generated by the second computing component based on at least a portion of the second set of operations, the image data, and the output of the one or more duplicated operations, and wherein the one or more adjusted parameters indicate one or more image sharpening parameters for sharpening the additional image data.
26. The method of claim 20, wherein the first computing component comprises an image processor and the second computing component comprises at least one of a video encoder, an extended reality component, a frame rate up-converter, or one or more components of an advanced driver-assistance system.
27. The method of claim 20, further comprising:
    determining one or more types of results from the one or more duplicated operations for the first computing component to use for the second subset of the first set of operations and for the second computing component to use for the second subset of the second set of operations; and
    generating the output based on the one or more types of results.
28. The method of claim 20, wherein the first set of operations comprises digital image processing operations, and wherein the second set of operations comprises at least one of video encoding operations or extended reality operations, the extended reality operations comprising at least one of object detection operations, visual inertial odometry operations, obstacle avoidance operations, or face detection operations.
29. The method of claim 20, wherein the first set of operations comprises digital image processing operations, and wherein the second set of operations comprise advanced driver-assistance system operations, the advanced driver-assistance system operations comprising at least one of speed estimation operations, distance estimation operations, collision avoidance operations, or collision detection operations.
30. The method of claim 20, wherein the one or more duplicated operations comprise at least one of motion estimation, image segmentation, or object detection, and wherein the output comprises at least one of an object map, texture information, or one or more motion vectors.
31. The method of claim 20, further comprising:
    obtaining, via the second computing component, the output of the one or more duplicated operations; and
    performing, via the second computing component, the second subset of the second set of operations using the image data and the output of the one or more duplicated operations.
32. The method of claim 31, further comprising:
    prior to performing the second subset of the second set of operations, refining, via the second computing component, the output for use in the second subset of the second set of operations.
33. The method of claim 20, wherein the second subset of the second set of operations comprises encoding the image data, the method further comprising:
    performing, via the second computing component, the second subset of the second set of operations to generate an encoded video bitstream based on the image data and the output of the one or more duplicated operations; and
    transmitting, via the second computing component, the encoded video bitstream.

34. The method of claim 20, further comprising:
providing the output of the one or more duplicated operations to the first computing component, the second computing component, and one or more additional computing components.

35. A non-transitory computer-readable medium having stored thereon instructions which, when executed by one or more processors, cause the one or more processors to:
obtain image data captured by an image sensor;
determine one or more duplicated operations that are the same between a first set of operations of a first computing component and a second set of operations of a second computing component, wherein the one or more duplicated operations include a first subset of the first set of operations of the first computing component and a first subset of the second set of operations of the second computing component, the first set of operations being different than the second set of operations;
perform the one or more duplicated operations on the image data; and
generate an output of the one or more duplicated operations for use by the first computing component to perform a second subset of the first set of operations and the second computing component to perform a second subset of the second set of operations, wherein the second subset of the first set of operations and the second subset of the second set of operations do not include the one or more duplicated operations.

* * * * *